US012482354B1

(12) United States Patent
Mesde et al.

(10) Patent No.: US 12,482,354 B1
(45) Date of Patent: Nov. 25, 2025

(54) COMPOSITE STREET SHADOWS FOR VEHICLES

(71) Applicant: Amazon Technologies, Inc., Seattle, WA (US)

(72) Inventors: Roland Mesde, Cupertino, CA (US); Alex Bessonov, San Jose, CA (US); Indraneel Mitra, Edgewater, NJ (US); Stefano Marzani, Mountain View, CA (US); Brett Francis, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 17/810,301

(22) Filed: Jun. 30, 2022

(51) Int. Cl.
| | |
|---|---|
| G08G 1/00 | (2006.01) |
| G06F 16/29 | (2019.01) |
| G06V 20/56 | (2022.01) |
| G07C 5/08 | (2006.01) |
| G08G 1/01 | (2006.01) |
| G08G 1/0967 | (2006.01) |
| H04W 4/44 | (2018.01) |

(52) U.S. Cl.
CPC ....... G08G 1/096775 (2013.01); G06F 16/29 (2019.01); G06V 20/56 (2022.01); G07C 5/0808 (2013.01); G08G 1/0112 (2013.01); H04W 4/44 (2018.02)

(58) Field of Classification Search
CPC .......... G08G 1/096775; G08G 1/0112; G07C 5/0808; H04W 4/44; G06F 16/29; G06V 20/56

USPC ......................................................... 701/117
See application file for complete search history.

(56) References Cited

U.S. PATENT DOCUMENTS

| | | | |
|---|---|---|---|
| 10,848,907 B1 | 11/2020 | Takla | |
| 2006/0178788 A1* | 8/2006 | Sasaki | G01C 21/26 |
| | | | 701/1 |

(Continued)

OTHER PUBLICATIONS

Article Defining Cloud Computing from Network Coverage. (Year: 2020).*

(Continued)

Primary Examiner — Tiffany P Young
Assistant Examiner — Michael T Dowling
(74) Attorney, Agent, or Firm — Alexander A. Knapp; Kowert, Hood, Munyon, Rankin & Goetzel, P.C.

(57) ABSTRACT

A vehicle information system maintains a street shadow representing attributes of an environment in which a vehicle is located or travels through. The attributes may include objects or events in the surrounding environment. In some embodiments, cloud-based computing devices maintain a primary street shadow, and roadside resources maintain information about short-lived objects or events that may be added to the primary street shadow to augment it. Additionally, a vehicle may further augment the street shadow representation with locally detected events and/or objects. Also, events and objects detected by a vehicle are provided to the roadside resource. The roadside resource may infer an estimated lifetime of the events and objects, and cache short-lived events and objects for distribution to other vehicles, and also provide long-lived events and objects to the cloud-computing devices for use in updating the primary street shadow.

20 Claims, 18 Drawing Sheets

(56) References Cited

U.S. PATENT DOCUMENTS

| | | | |
|---|---|---|---|
| 2008/0201070 A1* | 8/2008 | Kikuchi | G01C 21/3647 |
| | | | 701/533 |
| 2019/0384870 A1 | 12/2019 | Shiraishi et al. | |
| 2020/0065443 A1 | 2/2020 | Liu | |
| 2020/0104289 A1* | 4/2020 | Premawardena | G06F 16/182 |
| 2023/0084924 A1* | 3/2023 | White | G01C 21/32 |
| | | | 701/23 |
| 2023/0131715 A1* | 4/2023 | Chen | G01S 17/89 |
| | | | 702/159 |
| 2023/0332920 A1* | 10/2023 | Ogawa | G01C 21/3885 |

OTHER PUBLICATIONS

Stefan Boschert, et al., "Next Generation Digital Twin" Proceedings of TMCE 2018, May 7-11, 2018, Las Palmas de Gran Canaria, Spain,? Organizing Committee of TMCE 2018, ISBN 978-94-6186-910-4, pp. 2-11.
U.S. Appl. No. 17/710,585, filed Mar. 31, 2022, Roland Mesde, et al.
U.S. Appl. No. 17/710,634, filed Mar. 31, 2022, Roland Mesde, et al.
U.S. Appl. No. 17/710,644, filed Mar. 31, 2022, Roland Mesde, et al.
U.S. Appl. No. 17/810,311, filed Jun. 30, 2022, Indraneel Mitra.
U.S. Appl. No. 17/810,326, filed Jun. 30, 2022, Indraneel Mitra.
U.S. Appl. No. 17/810,192, filed Jun. 30, 2022, Indraneel Mitra.

\* cited by examiner

COMPOSITE STREET SHADOWS FOR VEHICLES

BACKGROUND

Modern vehicles, such as cars, trucks, motorcycles, etc. may include many different software applications that perform various functions for the vehicle. Also, modern vehicles often have antennas that provide connectivity with remote entities. For example, a vehicle may be equipped with a cellular antenna (e.g., 4G, 5G, etc.), and/or a Wi-Fi antenna.

In modern vehicles, various vehicle systems may use information about an environment in which the vehicle is operating in order to perform various vehicle functions. For example, a navigation system may receive map tiles from a mapping service and use the map tiles to display map information to a user of the vehicle. Also, some vehicles may provide driver assisted control or partially autonomous control. Such vehicles may also rely on information about the environment in which the vehicle is operating in order to perform such control functions.

In real-world settings, environments in which vehicles operate are dynamic and sometimes un-predictable. For example, weather conditions, road conditions, etc. may change in significant and un-predictable ways day-to-day or even minute-by-minute. In some cases, changes in environmental conditions in which a vehicle is operating may need to be updated quickly. For example, periodic updates from a central server may be insufficiently slow to properly account for short-lived environmental conditions.

Also, environmental conditions may drift over time (or moment to moment), leading to discrepancies between real-world environmental conditions and environmental conditions as indicated in information used by vehicle systems to perform vehicle functions. In some cases, such discrepancies may be inconsequential. However, in other cases, such discrepancies may need to be identified and accounted for in order to ensure proper functioning of the vehicle systems.

Figure 1:
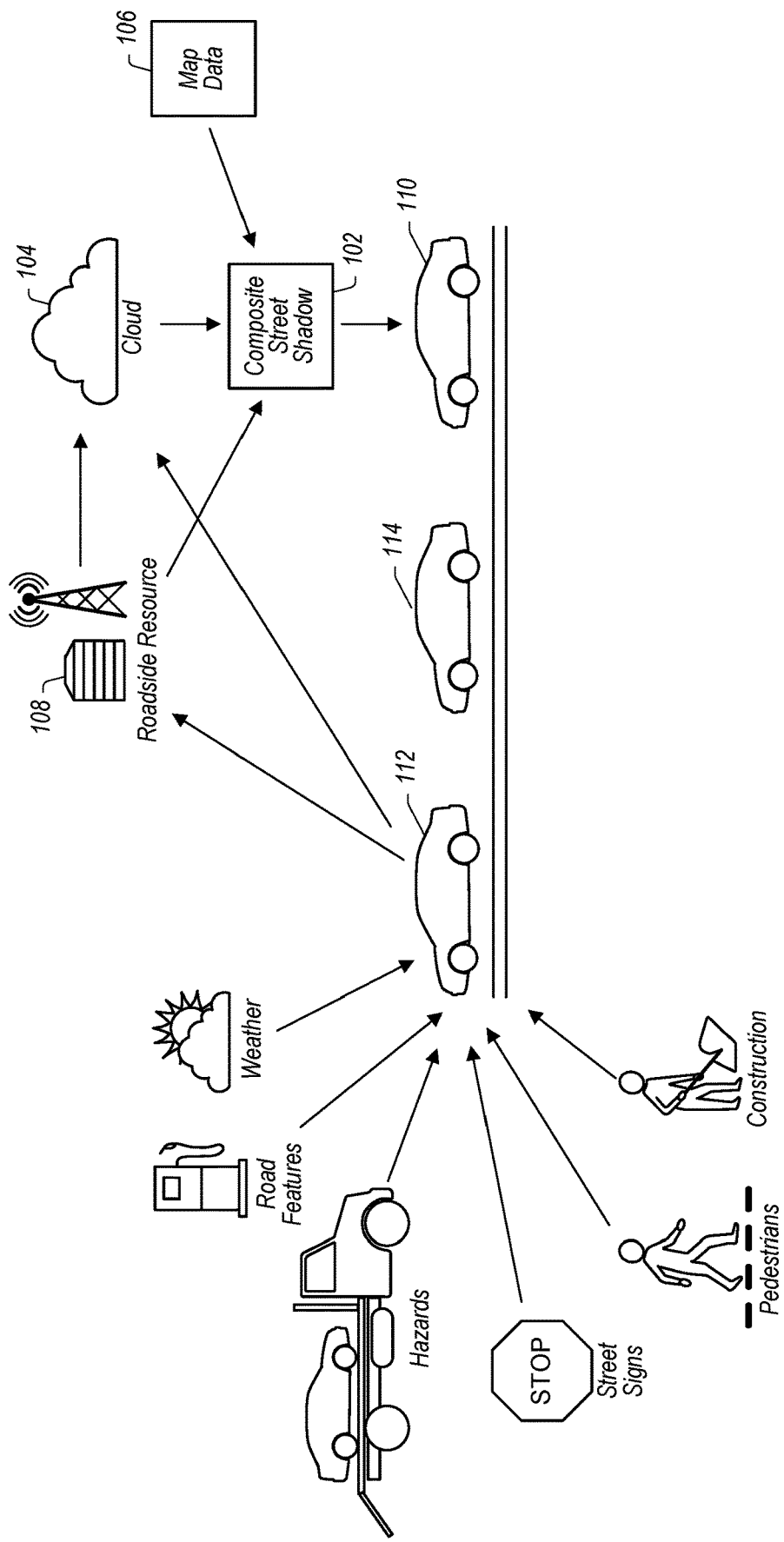
FIG. 1 illustrates collection and propagation of sensor data and information about events and objects in a surrounding environment of a vehicle to roadside resources and cloud-computing devices for use in updating a combined composite street shadow, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a vehicle information system that generates and maintains street shadows for vehicles and an in-vehicle agent that generates a composite street shadow using one or more street shadow tiles received from the vehicle information system that are augmented with events and/or objects indicated by a roadside resource, events and/or objects detected locally at the vehicle, and/or events and/or objects communicated to the vehicle from other vehicles. Also, in some embodiments, connected infrastructure may detect events and/or objects and provide information about the events and/or objects to the vehicle for use in a composite street shadow.

In some embodiments, long-lived features of an environment through which a vehicle is travelling (e.g., long-lived features of a street shadow) are incorporated into a street shadow maintained by one or more cloud-based computing devices that implement the vehicle information system. Also, short-lived features may be cached at a local roadside resource, such as an edge computing device, roadside unit, etc. The short-lived features may be provided by the roadside resource to other vehicles within a wireless communication range of the roadside resource for inclusion in a composite street shadow to be generated at the respective other vehicles.

In some embodiments, a road side resource may include mobile edge computing (MEC) infrastructure and/or road side units (RSUs). The road side resources may be configured to establish wireless connections with vehicles within a geofence range of the respective road side resource. In some embodiments, roadside resources may use various wireless communication protocols or technologies, such as 5G, 4G, Wi-Fi, dedicated short-range communication (DSRC), PC5, etc. In a similar manner, vehicles may use such various wireless communication protocols or technologies to communicate with a roadside resource or with another vehicle via direct vehicle-to-vehicle communications.

In some embodiments, the vehicle information system generates a model for determining expected lifetimes of detected events or objects. The model may be provided to roadside resources and/or vehicles for use in classifying detected events or objects as short-lived or long-lived. In some embodiments, the vehicle information system may dynamically update the model and provide updates to the roadside resources and/or vehicles. For example, a vehicle information system may validate previously predicted lifetimes for objects or events against later received data to see if the events or objects are still present (or not) as would be the case based on the previous lifetime prediction. If there are differences between the previously predicted lifetimes and the actual lifetimes, the vehicle information system may adjust the model to account for these differences. In some embodiments, various machine learning strategies may be used to dynamically adjust the model for determining expected lifetimes of detected events or objects.

In some embodiments, a roadside unit may detect anomalous objects or events in updates received from vehicles and may filter out the anomalous objects or events from further distribution to other vehicles.

In some embodiments, a street shadow may be generated for a large geographic area and may be divided into street shadow tiles to be provided to vehicles to communicate information about a surrounding environment adjacent to the particular location where the vehicle is located. In some embodiments, different street shadows may be maintained at a vehicle information system that overlap in geography. For example, a first street shadow may be maintained for a first customer of the vehicle information system and a second street shadow may be maintained for a second customer of the vehicle information system, wherein the first and second street shadow cover a same or overlapping geography. In some embodiments, the first customer, second customer, or both customers may opt into allowing their respective street shadows to be used in federated queries. In some embodiments, a federated query may be used to augment a given street shadow with information from one or more other street shadows. For example, a federated query may query the second street shadow for objects or events included in a given street shadow tile. In response to the federated query, results to be provided to a vehicle may include a street shadow tile of the first street shadow that has been augmented with objects or events included in a corresponding street shadow tile of the second street shadow. In some embodiments, the different customers of the vehicle information system may be different vehicle original equipment manufacturers (OEMs) and a federated query may allow the OEMs to leverage data included in other OEMs' street shadows to provide a fuller picture to the vehicles of either OEM that uses the vehicle information system. In some embodiments, customers, such as OEMs, may define one or more policies for sharing of street shadow information in federated queries. For example, in some embodiments, data that may be consider to identify people, businesses, etc., may be excluded from being used in federated query results. Also, a customer may define policies that exclude data for other reasons, such as data that may be considered proprietary.

In some embodiments, the vehicle information system may be part of a larger vehicle data service that collects and manages streaming data received from vehicles. In some embodiments, the vehicle information system and/or larger vehicle data service may be included in a service provider network of a cloud-based service provider that provides various other cloud-based services to customers and clients, such as cloud-computing services, storage, networking, data analytics, data warehousing, etc.

In some embodiments, a vehicle agent is configured to identify discrepancies between a locally stored model, such as a street shadow, and detected environmental conditions. The vehicle agent may apply local policies to comprehend the discrepancies, for example by comparing detected information to a local metadata registry, and may update a local cache used by other vehicle systems to incorporate/account for the discrepancies. The vehicle agent may further perform network discovery to identify interested recipients of the discrepancy information, such as other vehicles in a same geofence as the vehicle and/or a roadside resource in a same geofence as the vehicle. In some embodiments, the discrepancies may even be communicated to pedestrians in a geofence with the vehicle, for example to a handheld or wearable device worn by the pedestrians.

In some embodiments, in which the discrepancies are communicated to a roadside resource, the roadside resource may use a lifetime inference model to infer an expected lifetime of the discrepancies. For shorter-lived discrepancies, the roadside resource may distribute information about the shorter-lived discrepancies to other vehicles in communication with the roadside resource (or other entities, such as an electronic device of a pedestrian, as an example). For longer-lived discrepancies, the roadside resource may additionally, communicate the longer-lived discrepancies to a cloud-based vehicle information system for use in updating a model maintained by the cloud-based vehicle information system, such as a street shadow.

FIG. 1 illustrates collection and propagation of sensor data and information about events and objects in a surrounding environment of a vehicle to roadside resources (e.g., edge computing devices) and cloud-computing devices for use in updating a combined composite street shadow, according to some embodiments.

In some embodiments, a composite street shadow, such as composite street shadow 102, may be provided to a vehicle, such as vehicle 110. The composite street shadow 102 may include longer-lived events or objects that have been incorporated into a street shadow maintained in cloud computing system 104 and may additionally include short-lived events or objects that are cached at roadside resource 108 (but that have not been incorporated into the street shadow maintained in cloud computing system 104). Additionally, map data 106 may be provided to form the composite street shadow 102, or may have been incorporated into a street shadow maintained in cloud computing system 104 that is combined with events or objects from roadside resource 108 to form composite street shadow 102.

In some embodiments, events and objects detected by other vehicles may be used to populate the street shadow maintained by cloud computing system 104 and/or a local street shadow or other data repository of roadside resource 108. For example, vehicle 112 may detect longer-lived objects or events, such as road features and street signs, and those longer-lived objects or events may be provided directly to cloud computing system 104 for inclusion in a street shadow, or may be provided to cloud computing system 104 via roadside resource 108, or another edge computing device. Also, vehicle 112 may detect shorter-lived objects or events, such as weather events, construction events, pedestrians in the area or in the roadway (e.g., objects), hazards (e.g., events or objects). In some embodiments, vehicle 112 may forward both short-lived and long-lived events and objects to roadside resource 108, and the roadside resource 108 may implement a lifetime inference module that can be used to infer an expected duration of an event or an expected amount of time an object will be present at a given location. Based on such an inferred lifetime, the roadside resource 108 may classify events or objects as long-lived or short-lived. The long-lived events and objects may be forwarded to cloud computing system 104 for incorporation into a street shadow maintained by cloud computing system 104. The short-lived events and objects may be provided to other vehicles directly from the roadside resource 108, such as to vehicles 114 and 110, wherein the vehicles incorporate the short-lived events or objects into a local composite street shadow 102.

In some embodiments, long-lived events and objects may be provided directly to vehicles from roadside resource 108, for example during a time in which it takes the more permanent street shadow maintained at cloud computing system 104 to be updated to reflect the long-lived events or objects in the street shadow at the cloud.

In some embodiments, cloud computing system 104 may use a machine learning algorithm to update a model used to determine inferred lifetimes of events or objects. From time to time, the cloud computing system 104 may provide model updates to lifetime inference modules used by roadside resources, such as roadside resource 108, to predict expected lifetimes of events or objects. For example, a cloud computing system may train the model using long-lived event and object information received from roadside resource 108. As an example, if a given object is predicted to have a lifetime of 10 days, but later data provided to cloud computing system 104 indicates that after 5 days the given object is no longer present, this difference may be used (along with several other data points for other objects or events) to update a model used to determine inferred lifetimes of events or objects. The updated model may then be provided to roadside resources, such as roadside resource 108, to improve the accuracy of expected lifetime predictions that are made at the roadside resources with regards to detected events or objects.

In some embodiments, a vehicle, such as vehicle 112, may additionally implement a lifetime inference module used to infer lifetimes of detected events or objects. In some embodiments, events or objects with a very-short inferred lifetime may be used locally at vehicle 112 to augment its local street shadow, but may not be forwarded to roadside resource 108 or cloud computing system 104. For example, if a single pedestrian is crossing the street, this information may be used locally at vehicle 112, but because the single pedestrian is likely to have cleared the street before vehicle 114 or vehicle 110 arrive at the same location, it may be unnecessary (or misleading) to send the pedestrian as a detected object to be included in a street shadow for vehicle 114 or vehicle 110. This is because by the time vehicle 114 or 110 arrive at the location, the augmented street shadow would already be outdated because the pedestrian would no longer be present. However, in another example, if a concert were to have just let out and large crowds of pedestrians were present in a given area, this may be detected as an event and may be inferred to have a short-lifetime (but longer than a very short lifetime of the single pedestrian). This event information may be provided from vehicle 112 to roadside resource 108 for distribution to other vehicles in the area, such as vehicle 114 or vehicle 110. The information indicating the presence of the event "high pedestrian traffic in the area" may be used to augment a street shadow used by vehicle 114 or vehicle 110, such as combined street shadow 102. In yet another example, a new construction project or a new street sign may be detected as an event or an object and be inferred to have a long-lifetime. This event and object information may be forwarded from vehicle 112 to roadside resource 108 (or optionally directly to cloud computing service 104). The roadside resource 108 may determine that an expected duration of the new construction project or the new street sign has a length that exceeds a threshold duration that the roadside resource 108 uses to determine long-lived events or objects. In response to determining the construction project or new sign exceeds the threshold for long-lived events or objects, the roadside resource 108 may forward information describing the long-lived event or object (e.g., construction project or new street sign) to the cloud computing system 104 in a data stream used to update a street shadow maintained by cloud computing system 104.

In some embodiments, a roadside resource, such as roadside resource 108, may dynamically adjust a threshold time duration used to distinguish between short-lived and long-lived events or objects. For example, under a first set of circumstances, events or objects with expected lives greater than 5 days (as an example) may be considered long-lived, whereas under a second set of circumstances, events or objects with expected lives greater than 3 days (as an example) may be considered long-lived. In some embodiments, the threshold duration of time used to distinguish between long-lived and short-lived events or objects may be adjusted based on a capacity of the roadside resource to cache additional information describing objects or information describing events. For example, as capacity of a roadside resource to cache information describing additional events or objects becomes constrained, the threshold duration may be lowered so that more events and objects are forwarded on to the cloud computing system 104 (and removed from the cache of the roadside resource 108) in order to free up capacity at roadside resource 108 to store information describing additionally detected events or objects. Also, as more capacity is added to the roadside resource 108, the threshold expected lifetime for an event or object to be considered long-lived may be increased, thus resulting in more events or objects being considered short-lived and cached at the roadside resource 108.

Figure 2:
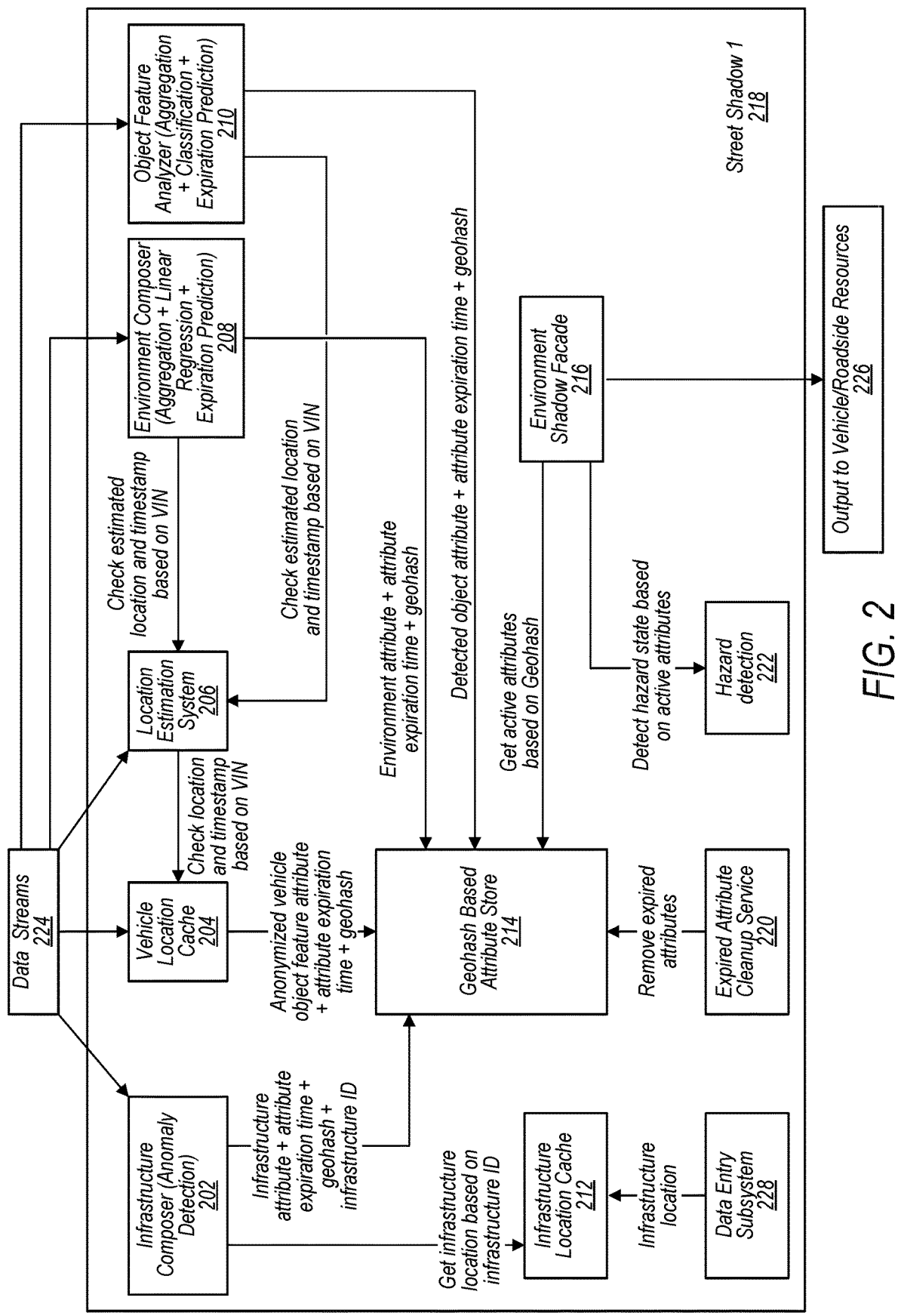
FIG. 2 illustrates an example configuration of a system that receives streaming data, such as from vehicles as shown in FIG. 1, and generates and/or maintains a street shadow using the streaming data, according to some embodiments.

In some embodiments, a street shadow maintained at cloud computing system 104 may additionally include components as described in FIG. 2, that manage and update the street shadow. Also, the street shadow shown in FIG. 2 may be implemented in the context of the larger system shown in FIG. 3. Both of which may be implemented using cloud-based services of a service provider network, such as may implement cloud computing service 104.

For example, FIG. 2 illustrates a configuration of a system that receives streaming data, such as from vehicles as shown in FIG. 1, and generates and/or maintains a street shadow using the streaming data, according to some embodiments.

Data streams 224, which may include information about events or objects detected at connected infrastructure and/or other connected vehicles may be provided to street shadow 1 (218). In some embodiments, the data streams 224 may include sensor data provided directly to a cloud computing system, such as cloud computing system 104, from a connected vehicle, such as vehicle 112. Also, the data streams 224 may include data comprising long-lived events and/or long-lived objects, as determined by a roadside resource, such as roadside resource 108. In some embodiments, data received from connected infrastructure, connected vehicles, and roadside resources may pass through a data processing pipeline to generate enriched data that is provided as data streams 224 to a street shadow, such as street shadow 1 (218).

As shown in FIG. 2 the data streams 224 may be provided to different components of street shadow 1 (218) in order to update the street shadow. For example, connected infrastructure information may be provided to infrastructure composer 202, which may also include anomaly detection to detect anomalies in the provided data stream. In some embodiments, the data stream portion provided to infrastructure composer 202 may include infrastructure IDs for pieces of infrastructure described in the data stream, along with a state attribute assigned to the given piece of infrastructure for which the infrastructure ID is given. Also, each key-value pair (e.g., infrastructure ID and associated state) may be time-stamped in the data stream.

A street shadow, such as street shadow 1 (218), may also include vehicle location cache 204 that tracks a current location of a vehicle to which the street shadow is to be provided or from which the street shadow receives a data stream. In some embodiments, the data stream portion provided to vehicle location cache 204 may include a vehicle identification number (VIN) for a vehicle providing data in the data stream as well as a current location of the vehicle. For example, the VIN and location may form a key-value pair, wherein the VIN is a key and the location is a current value associated with that key. Also, each-key value pair (e.g., VIN and associated location) may be time-stamped in the data stream.

Additionally, since the vehicle may be in motion, the location of the vehicle may be estimated to determine a current location based on the last known location along with the speed and direction of travel of the vehicle. For example, a portion of the data stream 224 provided to location estimation system 206 may include a VIN for a given vehicle and associated attributes of the given vehicle, such as speed, acceleration, direction, map route being followed, and a time stamp. In some embodiments, the location estimation system 206 may use a last known location obtained from vehicle location cache 204 in order to estimate the current location of the given vehicle. The location estimation system 206 may query the vehicle location cache 204 for the latest location of a vehicle using the vehicle's VIN. Based on the known location of the vehicle at a particular point in time and using a known speed, direction, and route, a current location at a current moment in time (subsequent to the particular point in time of the cached location information) may be estimated.

Additionally, event/environment information may be included in data streams 224 and the event/environment information may be provided to environment composer 208, which may aggregate the environment/event information, apply a linear regression analysis to model the environment, and may apply expiration prediction to age out events or environment conditions that have expired based on estimated lifetimes, for example as may have been determined at a roadside resource.

In a similar manner, object information may be included in the data streams 224 and the object feature analyzer 210 may be provided the object information. In some embodiments, object feature analyzer 210 may aggregate the object information. For example, multiple connected vehicles may detect the same object and send information describing the same object to a street shadow, such as street shadow 1 (218). Also, an object may be classified into an object type and expiration rules may be applied to determine whether or not the object has expired (e.g., its expected lifetime has been exceeded). In some embodiments, environment composer 208 and object feature analyzer 210 may query location estimation system 206 for a current location of a given vehicle at a given time stamp. This location information may be used to properly place events and objects detected by the given vehicle at the proper geographic locations in the street shadow. The environment attributes (along with attribute expiration times and geohashes) may be provided to geohash based attribute store 214. Also, detected objects (along with attribute expiration times and geohashes) may be provided to the geohash based attribute store 214. Additionally, infrastructure attributes (along with attribute expiration time, geohash, and infrastructure ID) may be provided to geohash based attribute store 214.

In some embodiments, a street shadow 218 may further include a data entry subsystem 228 that allows for entry of infrastructure location information that is stored in infrastructure location cache 212. The infrastructure composer 202 may query the infrastructure location cache 212 to determine a current location of a piece of infrastructure.

In some embodiments, a clean-up process may remove expired attributes from the geohash based attribute store 214, such as expired attribute cleanup service 220.

In some embodiments, the geohash based attribute store 214 may represent a full set of attributes for a given street shadow, such as street shadow 1 (218). For example, the geohash based attribute store 214 may store a full set of attributes for a full set of locations included in a given street shadow, such as street shadow 1 (218). However, a user of a street shadow, such as street shadow 1 (218), may be interested in only a portion of the street shadow, such as a street shadow tile or set of tiles at a location of a vehicle or within a certain range of the vehicle. Thus, the output to vehicles/roadside resources may be only a portion of the attributes included in a street shadow. These attributes may be combined with other data such as map data or a vehicle shadow via environment façade module 216. For example, environment shadow façade module 216 may provide a set of one or more street shadow tiles for delivery to a vehicle. In some embodiments, the street shadow tiles may comprise map tiles that have been augmented with attribute from geohash based attribute store 214 for geohashes represented by the map tiles. The street shadow tiles may be generated by environment shadow façade 216 and provided to output 226. In some embodiments the attributes may be evaluated by hazard detection module 222 to determine if there is an active hazard in the street shadow tile to be output to the vehicle and/or roadside unit. In some cases, active hazards may be indicated via annotations or other indicators in the street shadow tiles provided to output 226.

Figure 3:
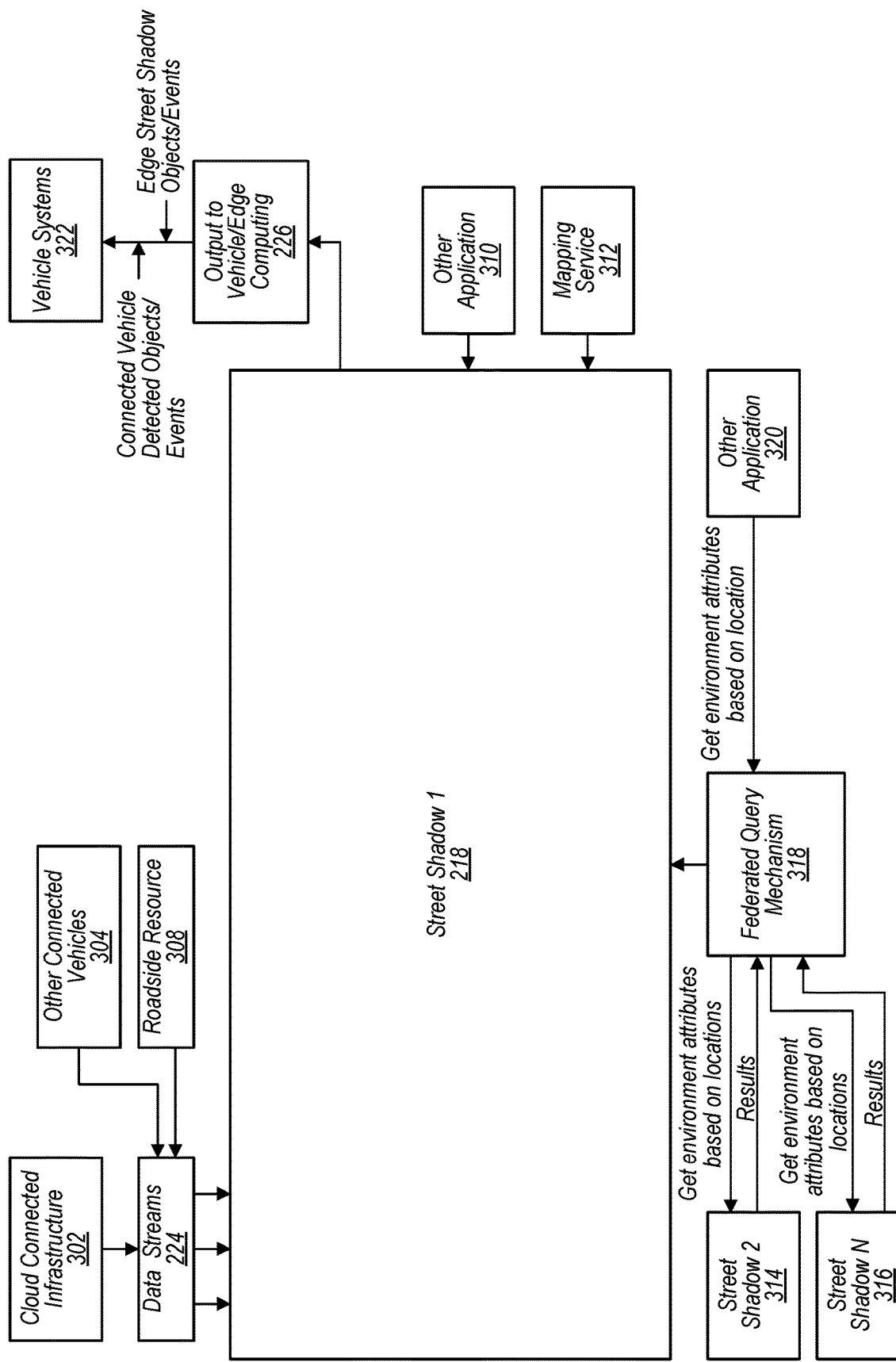
FIG. 3 illustrates additional details about systems that may interact with a street shadow, for example to provide information to the street shadow, query the street shadow, or provide information from the street shadow to other systems, such as vehicles, according to some embodiments.

FIG. 3 illustrates additional details about systems that may interact with a street shadow, for example to provide information to the street shadow, query the street shadow, or provide information from the street shadow to other systems, such as vehicles, according to some embodiments.

In some embodiments, the data streams 224 (as shown in FIG. 2) may include information from cloud connected infrastructure 302, other connected vehicles 304, and roadside resources 308. In some embodiments, a mapping service 312 and/or other applications may query the street shadow for attributes, such as via the environment shadow façade module 216.

In some embodiments, attributes may be queried from multiple street shadows via a federated query mechanism. For example, federated query mechanism 318 may query street shadow 1 (218), street shadow 2 (314) and street shadow N (316). In some embodiments, a particular application, such as other application 320, may signal that a federated query is to be performed to populate a street shadow tile to be provided to a street shadow tile recipient, such as a vehicle, or other application.

In some embodiments, the output of the street shadow 1 (218) is augmented with attributes from street shadow 2 (314) and street shadow N (316) via federated query mechanism 318. The augmented attributes are provided as output 226 to vehicles and/or edge computing devices. The federated query output may further be augmented with objects or events detected locally at a recipient vehicle as well as with short-lived objects or events that are cached at a roadside resource, but that are not already included in the street shadow output 226. This augmented or "composite" street shadow may then be provided to vehicle systems 322 in order to perform various vehicle functions or control functions.

Figure 4:
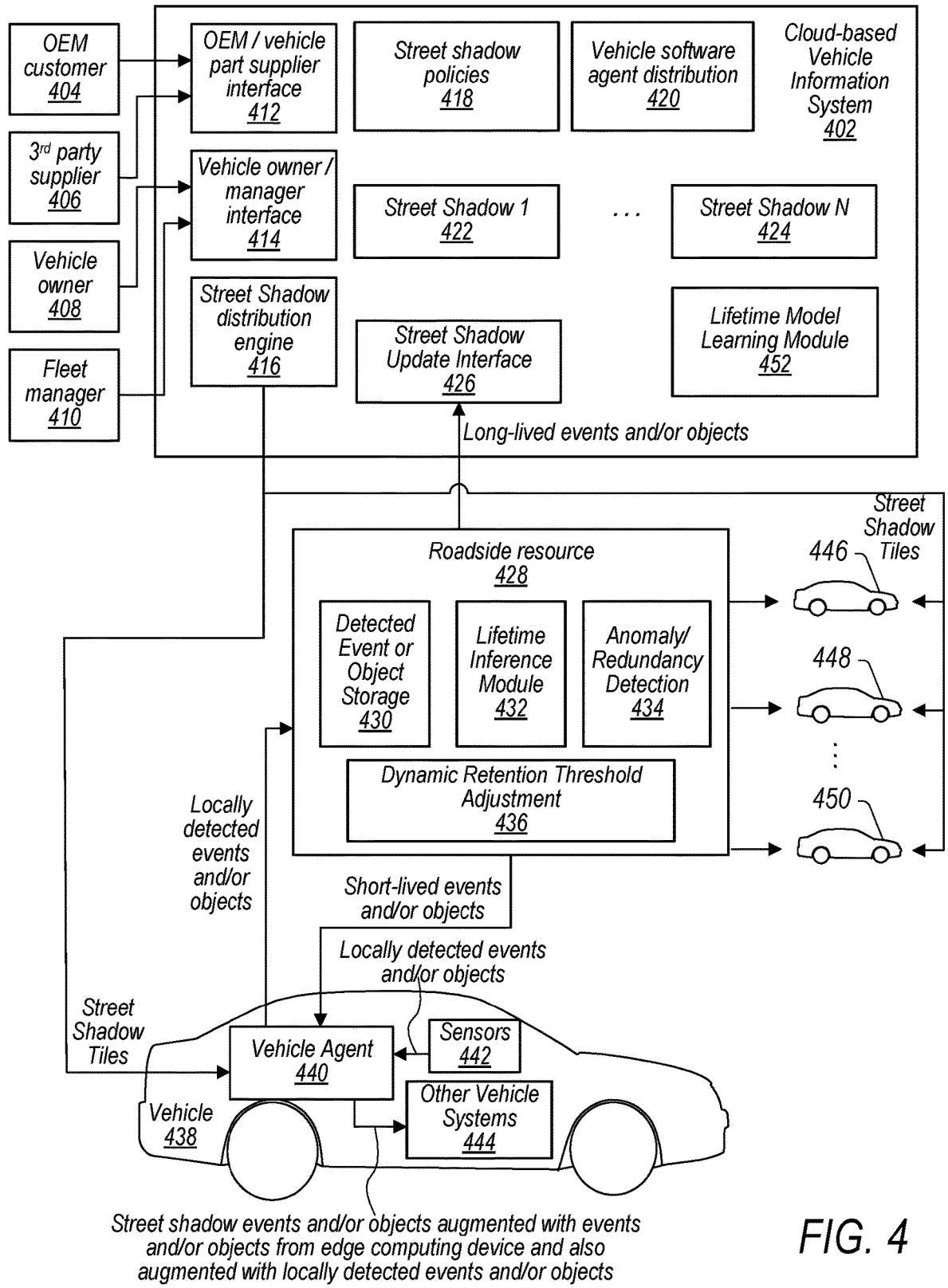
FIG. 4 is a logical block diagram illustrating a cloud-based vehicle information system that maintains and distributes street shadows, according to some embodiments.

FIG. 4 is a logical block diagram illustrating a cloud-based vehicle information system that maintains and distributes street shadows, according to some embodiments.

In some embodiments, a cloud-based vehicle information system, such as cloud-based vehicle information system 402, may host multiple street shadows for multiple customers of the cloud-based vehicle information system. For example, different vehicle original equipment manufacturers (OEMs) may be customers of the cloud-based vehicle information system 402, and the cloud-based vehicle information system 402 may host different street shadows for respective ones of the OEM customers. In some embodiments, the multiple street shadows may cover a same or overlapping geographic area, but may include attributes generated from different fleets of vehicles, such as fleets corresponding to vehicles manufactured by the different OEMs.

In some embodiments, a cloud-based vehicle information system, such as cloud-based vehicle information system 402, may include various interfaces that allow customers, such as OEM customer 404, third-party supplier 406, vehicle owner 408, and fleet manager 410, to define policies to be used for generating and maintaining a street shadow, as well as for sharing attribute information from the street shadow with others. Also, cloud-based vehicle information system 402 may provide governance to ensure that information provided to the street shadow is formatted in accordance with a schema used by the cloud-based vehicle information system to process data streams. Likewise, the cloud-based vehicle information system may ensure that customer policies conform to governance requirements such as that the attributes of the street shadow follow one or more standard schemas.

In some embodiments, customer provided (or selected) policies may be stored in street shadow policies 418. In some embodiments, a local street shadow portion may be implemented at a vehicle agent of a vehicle, such as vehicle agent 440, and street shadow policies may be provided to the local vehicle agent for use in maintain the local street shadow portion. In some embodiments, the vehicle agent 440 may be provided to participating vehicles by vehicle software agent distribution 420 of the cloud-based vehicle information system 402.

In some embodiments, street shadow tiles (e.g., street shadow portions) may be provided to a vehicle agent of a vehicle, such as vehicle agent 440 of vehicle 438 via street shadow distribution engine 416, which may include an environment shadow façade module, such as environment shadow façade module 216. Optionally, the street shadow distribution engine 416 may include a federated query mechanism, such as federated query mechanism 318. In some embodiments, the street shadow distribution engine 416 may provide an output such as output 226 as shown in FIGS. 2 and 3.

In some embodiments, different street shadow tiles for different locations may be provided to different vehicles via street shadow distribution engine 416. In some embodiments, the different street shadow tiles may be populated with attributes from a single street shadow or federated query results that augment attributes from a first street shadow with attributes from one or more other street shadows. For example, attributes from street shadow 1 (422) may be augmented with attributes from street shadow N (424) via a federated query mechanism. In some embodiments, customers of the cloud-based vehicle information system 402, such as OEM customer 404, etc., may define types of attributes that may be shared via a federated query mechanism or other limitations on how attributes from their respective street shadow may be shared. For example, a third-party supplier 406 customer of the cloud-based vehicle information system 402 may permit attribute results from its street shadow be used to augment street shadows of multiple OEMs that use parts supplied by the third-party supplier. In some embodiments, a vehicle owner 408 or fleet manager 410 may also manage their own street shadows and define how attributes from their respective street shadows are to be shared.

As shown in FIG. 4, street shadow tiles may be provided to vehicle 438 and other vehicles, such as vehicles 446, 448, and 450. Also, roadside resource 428 may store short-lived (or recently detected long-lived) events or objects in detected event or object storage 430. The roadside resource 428 may provide information describing these locally cached events and objects to vehicle agent 440 of vehicle 438 in order to augment the street shadow tiles received from cloud-based vehicle information system 402. In a similar manner, vehicles 446, 448, and 450 may be provided such information to their respective vehicle agents. In some embodiments, only a portion of the cached events or objects may be provided based on a geographic location of the respective vehicles and based on location metadata associated with the cached events or objects.

Additionally, the respective vehicles, such as vehicle 438, may further augment the street shadow tiles with locally detected events or objects that may be very short-lived, or which may not yet have been provided to roadside resource 428 or cloud-based vehicle information system 402. For example, events or objects detected by sensors 442 may be provided to vehicle agent 440. The vehicle agent 440 may augment a local street shadow representation to be used by other vehicle systems 444 with the events and attributes received from road side resource 428 and the events or objects detected locally via sensors 442.

Also, vehicle agent 440 may provide locally detected events or objects to roadside resource 408 for use in populating a local cache, such as detected event or object storage 430, and/or for further forwarding to cloud-based vehicle information system 402.

In some embodiments, a roadside resource, such as roadside resource 428, includes a lifetime inference module 432 that predicts expected lifetimes for events or objects. The roadside resource 428 may then apply a retention threshold to events or objects, wherein events or objects with expected lifetimes greater than the retention threshold are forwarded on to street shadow update interface 426 of cloud-based vehicle information system 402. Events or objects with lifetimes shorter than the retention threshold may be maintained at the roadside resource 428 and stored in detected event or object storage 430. In some embodiments, the retention threshold may be dynamically adjusted by dynamic retention threshold adjustment module 436 to throttle an amount of events or objects sent to detected event or object storage 430 versus those that are forwarded on to cloud-based vehicle information system 402. Additionally, roadside resource 428 may include an anomaly and/or duplicate detection module 434 that filters out anomalous or duplicate events or objects.

In some embodiments, cloud-based vehicle information system 402 further includes lifetime model learning module 452, which may use one or more machine learning modules to update models used by lifetime inference module 432 to predict expected lifetimes of events or objects.

Figure 5:
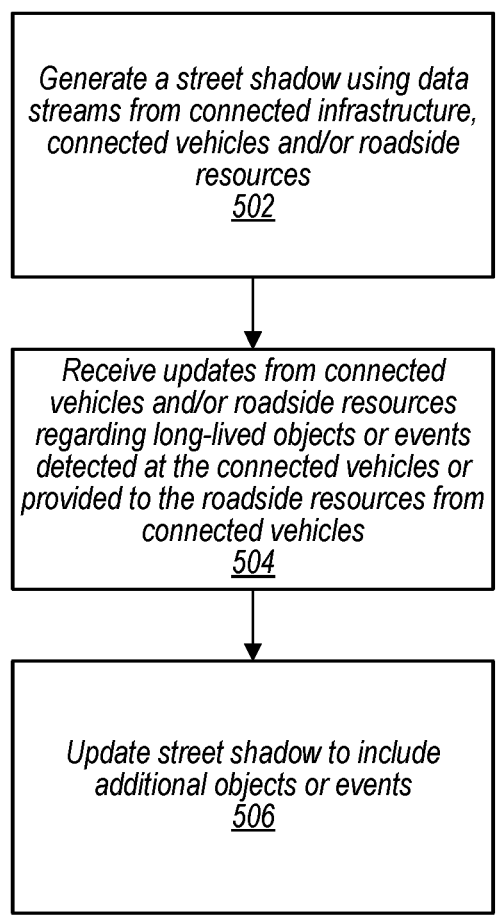
FIG. 5 is a process flow diagram illustrating steps a cloud-based vehicle information system performs to generate and maintain a street shadow, according to some embodiments.

FIG. 5 is a process flow diagram illustrating steps a cloud-based vehicle information system performs to generate and maintain a street shadow, according to some embodiments.

At block 502, a vehicle information system, such as cloud-based vehicle information system 402, generates a street shadow, such as street shadow 1 (218) shown in FIG. 2 or 3 street shadows 422 and 424 shown in FIG. 4. The street shadows may be implemented as part of a service provider network that offers cloud services via cloud computing systems, such as cloud computing systems 104 as shown in FIG. 1. The street shadow is generated using data streams, such as data streams 224 as shown in FIGS. 2 and 3. The data streams may include information about detected objects or events received from connected infrastructure, other connected vehicles, and/or from roadside resources.

At block 504, the vehicle information system receives updates, for example via street shadow update interface 426, as shown in FIG. 4, or as included in data streams 224 shown in FIGS. 2 and 3. At least some of the updates may have been filtered at a roadside resource to remove anomalous or duplicate events or objects, and may also have been filtered for short-lived events or objects, wherein long-lived objects are forwarded on to the vehicle information system and short-lived events or objects are cached locally at the roadside resource.

At block 506, the vehicle information system updates the street shadow to include the additional long-lived events or objects received at 504. Also, expired events or objects may be removed, for example via expired attribute cleanup service 220, as shown in FIG. 2.

Figure 6:
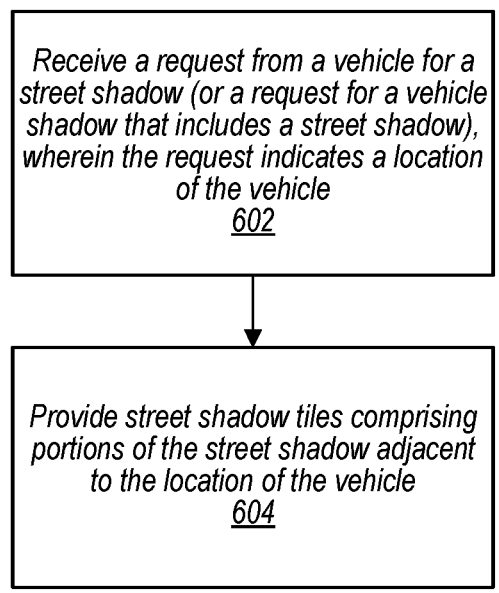
FIG. 6 is a process flow diagram illustrating steps a cloud-based vehicle information system performs to distribute street shadow tiles to vehicles based on locations of the respective vehicles, according to some embodiments.

FIG. 6 is a process flow diagram illustrating steps a cloud-based vehicle information system performs to distribute street shadow tiles to vehicles based on locations of the respective vehicles, according to some embodiments.

At block 602, a vehicle information system, such as cloud-based vehicle information system 402, receives a request from a vehicle for a street shadow (or street shadow portion). In some embodiments, a street shadow may be provided as a sub-component of a vehicle shadow that describes various conditions or states of the vehicle, wherein the street shadow describes a surrounding environment of the vehicle at a current location of the vehicle. The request may indicate the current location of the vehicle, and/or other information that may be used to determine the current location of the vehicle, such as speed, direction, route, etc.

At block 604, the vehicle information system provides one or more street shadow tiles comprising attributes for a portion of the street shadow adjacent to (and including) the location of the vehicle. For example, environment shadow façade module 216 may provide the one or more street shadow tiles as an output 226. In some embodiments, an event detected at the vehicle may be used to determine a range of street shadow tiles to be provided to the vehicle. For example, if an event is detected indicating a road is closed, a new route may be needed and a range of street shadow tiles to be provided may be determined based on the road closed event and based on map routing information that indicates an alternative route to be taken.

Figure 7:
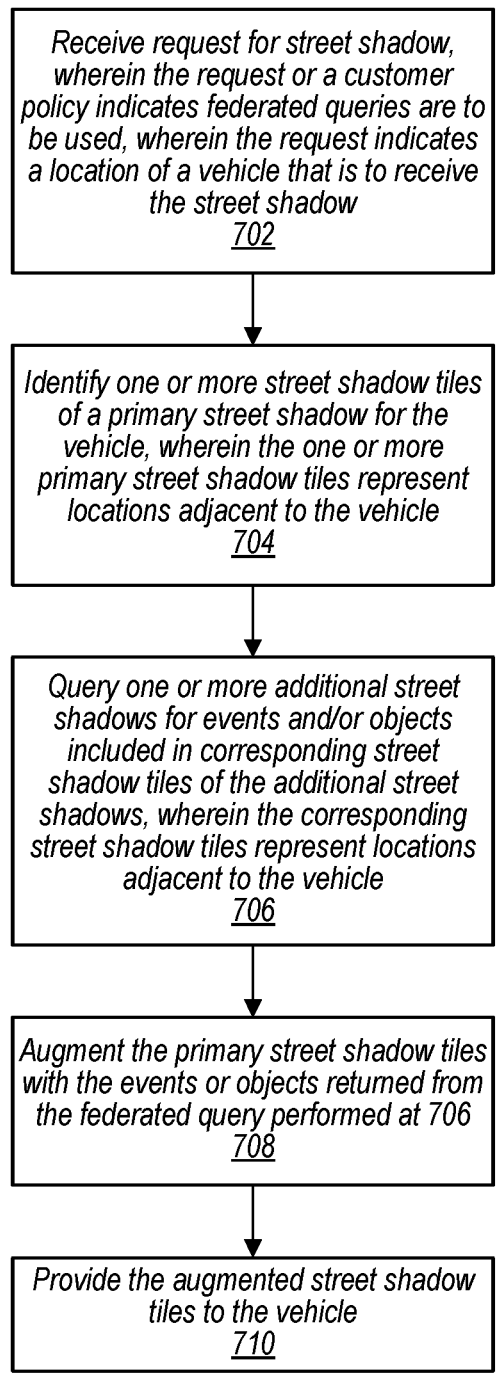
FIG. 7 is a process flow diagram illustrating steps a cloud-based vehicle information system performs in order to execute a federated query across multiple street shadows and provide a street shadow tile to a vehicle, wherein the street shadow tile has been augmented with results from one or more additional street shadows (that were targeted in the federated query), according to some embodiments.

FIG. 7 is a process flow diagram illustrating steps a cloud-based vehicle information system performs in order to execute a federated query across multiple street shadows and provide a street shadow tile to a vehicle, wherein the street shadow tile has been augmented with results from one or more additional street shadows (that were targeted in the federated query), according to some embodiments.

At block 702, a vehicle information system, such as cloud-based vehicle information system 402, receives a request for a street shadow (or portion of a street shadow) wherein the request (or a customer policy) indicates federated queries are to be used, and wherein the request indicates a location of a vehicle that is to receive the street shadow.

At block 704, a component of the vehicle information system, such as environment shadow façade module 216, identifies one or more street shadow tiles of a primary street shadow for the vehicle, wherein the one or more primary street shadow tiles represent locations adjacent to (and/or including) the vehicle.

At block 706, a component of the vehicle information system, such as federated query mechanism 318, queries one or more additional street shadows for events and/or objects (e.g., attributes) included in corresponding street shadow tiles of the additional street shadows, wherein the corresponding street shadow tiles represent locations adjacent to (and/or including) the vehicle, Then, at block 708, the component of the vehicle information system, such as federated query mechanism 318, augments the primary street shadow tiles with the events or objects returned from the federated query performed at 706, and at block 710 provides the augmented street shadow tiles to the vehicle.

Figure 8:
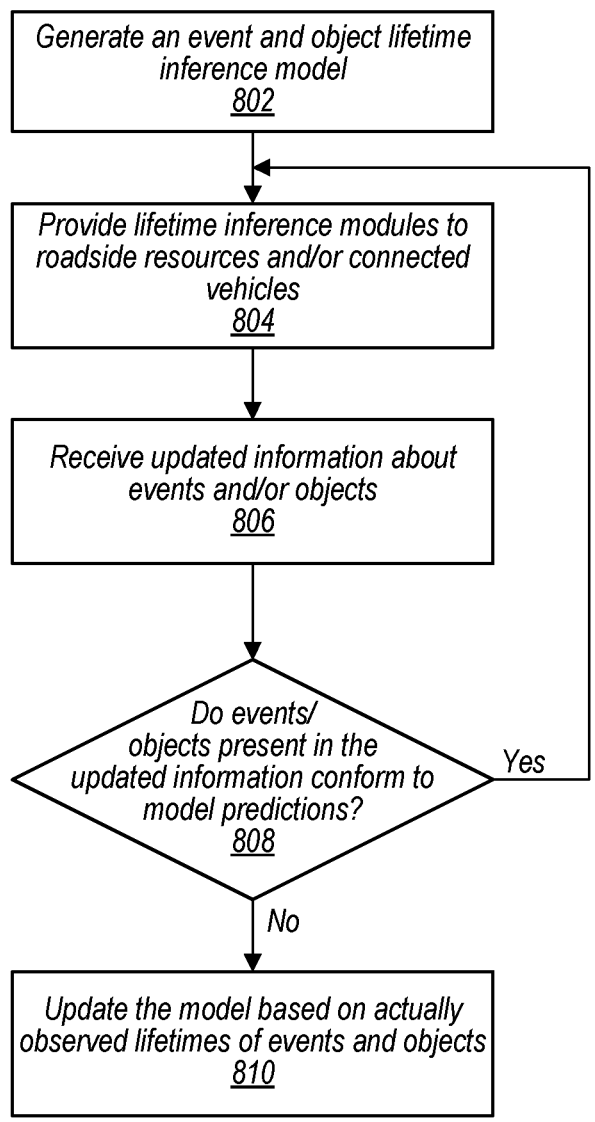
FIG. 8 is a process flow diagram illustrating steps a cloud-based vehicle information system performs to generate and update a lifetime inference model used by roadside resources and/or in-vehicle agents to determine expected lifetimes of detected events or objects, according to some embodiments.

FIG. 8 is a process flow diagram illustrating steps a cloud-based vehicle information system performs to generate and update a lifetime inference model used by roadside resources and/or in-vehicle agents to determine expected lifetimes of detected events or objects, according to some embodiments.

At block 802, a component of the vehicle information system, such as lifetime model learning module 452 of vehicle information system 402, generates an event object lifetime inference model and, at block 804, provides the model for use by roadside resources and/or vehicles, such as for use by lifetime inference module 432 of roadside resource 428. Note that while not shown in FIG. 4, in some embodiments, respective ones of the vehicles may also implement a lifetime inference module, similar to lifetime inference module 432.

At block 806, the vehicle information system receives updated information about events and/or objects. This updated information may be used to validate previous predictions. For example, if an event was predicted to last a certain amount of time, later updates may indicate that the event is still ongoing or not. Thus, the actual duration of the event (or the actual amount of time an object was present at a location) may be determined and compared to a predicted lifetime for the event or object. The actual duration may be used to further train the model to more accurately predict lifetimes of events or objects. For example, at block 808, it is determined whether or not events or objects for which predictions were previously made are still present in the updated information and whether the presence (or lack thereof) conform to the previous model predictions. If not, at block 810 the model may be updated based on the actually observed lifetimes of the events or objects. The updating may be done in various ways.

Figure 9:
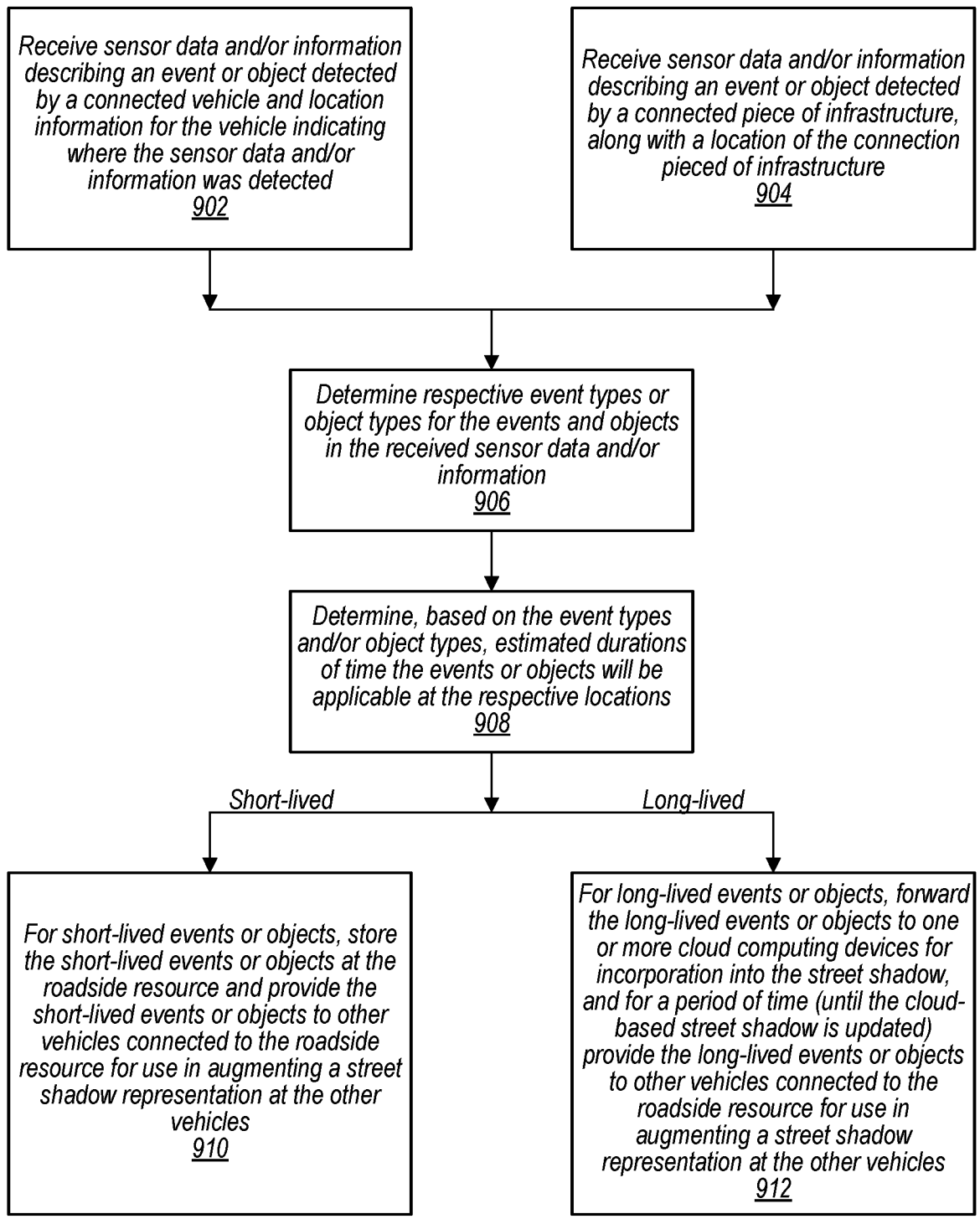
FIG. 9 is a process flow diagram illustrating steps a roadside resource performs in order to distribute events and objects detected by vehicles in communication with the roadside resource to other vehicles in communication with the roadside resource and/or to a cloud-based vehicle information system, according to some embodiments.

FIG. 9 is a process flow diagram illustrating steps a roadside resource performs in order to distribute events and objects detected by vehicles in communication with the roadside resource to other vehicles in communication with the roadside resource and/or to a cloud-based vehicle information system, according to some embodiments.

At block 902, a roadside resource receives sensor data and/or information describing an event or object detected by a connected vehicle and location information for the vehicle indicating where the sensor data and/or information was detected. Also, at block 904, the roadside resource receives sensor data and/or information describing an event or object detected by a connected piece of infrastructure, along with a location of the connected piece of infrastructure.

At block 906, the roadside resource (optionally) determines respective event types or object types for the events and/or objects in the received sensor data and/or information. In some embodiments, the determination of object types and/or event types may additionally, or alternatively, have already been performed, for example at the connected vehicle or at the connected infrastructure.

At block 908, the roadside resource determines, based on the event types and/or object types, estimated durations of time the events or objects will be applicable at the respective locations. For example, a lifetime inference module, such as lifetime inference module 432 of roadside resource 428, may determine expected lifetimes of the detected events and/or objects.

For short-lived events or objects, at block 910, the roadside resource stores the short-lived events or objects at the roadside resource and provides the short-lived events or objects to other vehicles connected to the roadside resource for use in augmenting a street shadow representation at the other vehicles.

For long-lived events or objects, at block 912, the roadside resource forwards the long-lived events or objects to one or more cloud computing devices for incorporation into the street shadow, and, for a period of time (until the cloud-based street shadow is updated), provides the long-lived events or objects to other vehicles connected to the roadside resource for use in augmenting a street shadow representation at the other vehicles.

Figure 10:
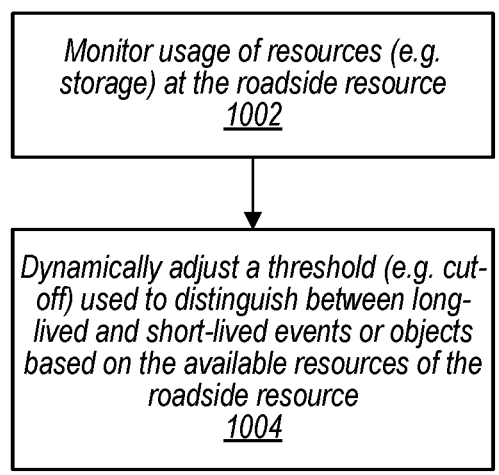
FIG. 10 is a process flow diagram illustrating steps a roadside resource performs to throttle events and objects stored locally at the roadside resource versus those forwarded on to a cloud-based vehicle information system, wherein a threshold expected lifetime for events or objects is used for determining retention of the events or the objects at the roadside resource, and wherein the threshold is adjusted to perform the throttling, based on availability of resources at the roadside resource, according to some embodiments.

FIG. 10 is a process flow diagram illustrating steps a roadside resource performs to throttle events and objects stored locally at the roadside resource versus those forwarded on to a cloud-based vehicle information system, wherein a threshold expected lifetime for events or objects is used for determining retention of the events or the objects at the roadside resource, and wherein the threshold is adjusted to perform the throttling, based on availability of resources at the roadside resource, according to some embodiments.

As discussed above, a dynamic threshold adjustment module, such as dynamic threshold adjustment module 436 of roadside resource 428, may dynamically adjust a boundary between what expected age of an event or object is considered to be short-lived or long-lived. In some embodiments, the boundary may be adjusted based on a capacity of a given roadside resource to cache additional information for detected events or objects.

For example, at block 1002, a roadside resource (e.g., dynamic threshold adjustment module 436 of roadside resource 428) monitors resources (e.g., storage, compute, etc.) at the roadside resource. Also, at block 1004, the roadside resource (e.g., dynamic threshold adjustment module 436 of roadside resource 428) dynamically adjusts a threshold (e.g., cut-off) used to distinguish between long-lived and short-lived events or objects based on the available resources of the roadside resource.

Figure 11:
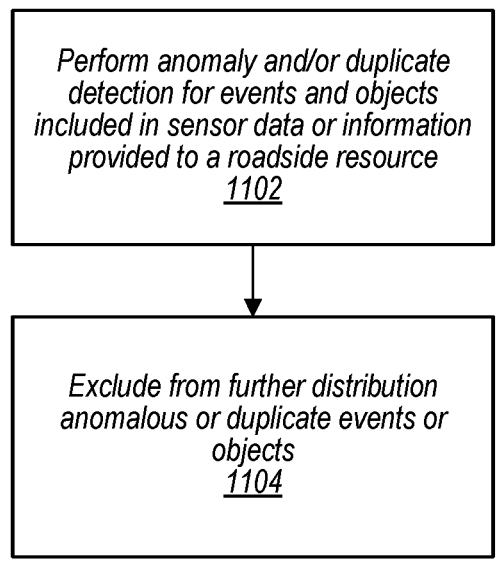
FIG. 11 is a process flow diagram illustrating steps performed by a roadside resource to detect anomalous or duplicate events or objects and exclude the anomalous or duplicate events or objects from further distribution to other vehicles, according to some embodiments.

FIG. 11 is a process flow diagram illustrating steps performed by a roadside resource to detect anomalous or duplicate events or objects and exclude the anomalous or duplicate events or objects from further distribution to other vehicles, according to some embodiments.

At block 1102, a roadside resource (e.g., anomaly/redundancy detection module 434 of roadside resource 428) performs anomaly and/or duplicate detection for events and objects included in sensor data or information provided to a roadside resource. Also, at block 1104, the roadside resource (e.g., anomaly/redundancy detection module 434 of roadside resource 428) excludes from further distribution anomalous or duplicate events or objects. For example, the roadside unit may not distribute anomalous or duplicate events or objects to other vehicles. In some embodiments, data forwarded to a cloud-based vehicle information system, such as vehicle information system 402, may also be filtered to remove anomalous or duplicate objects or events. Also, in some embodiments, un-filtered information may additionally, or alternatively, be provided to the cloud-based vehicle information system, such as vehicle information system 402. In some embodiments, the cloud-based vehicle information system, such as vehicle information system 402, may validate the filtering performed at the roadside resource and/or determine filter updates based on a comparison of the filtered and un-filtered information.

Figure 12:
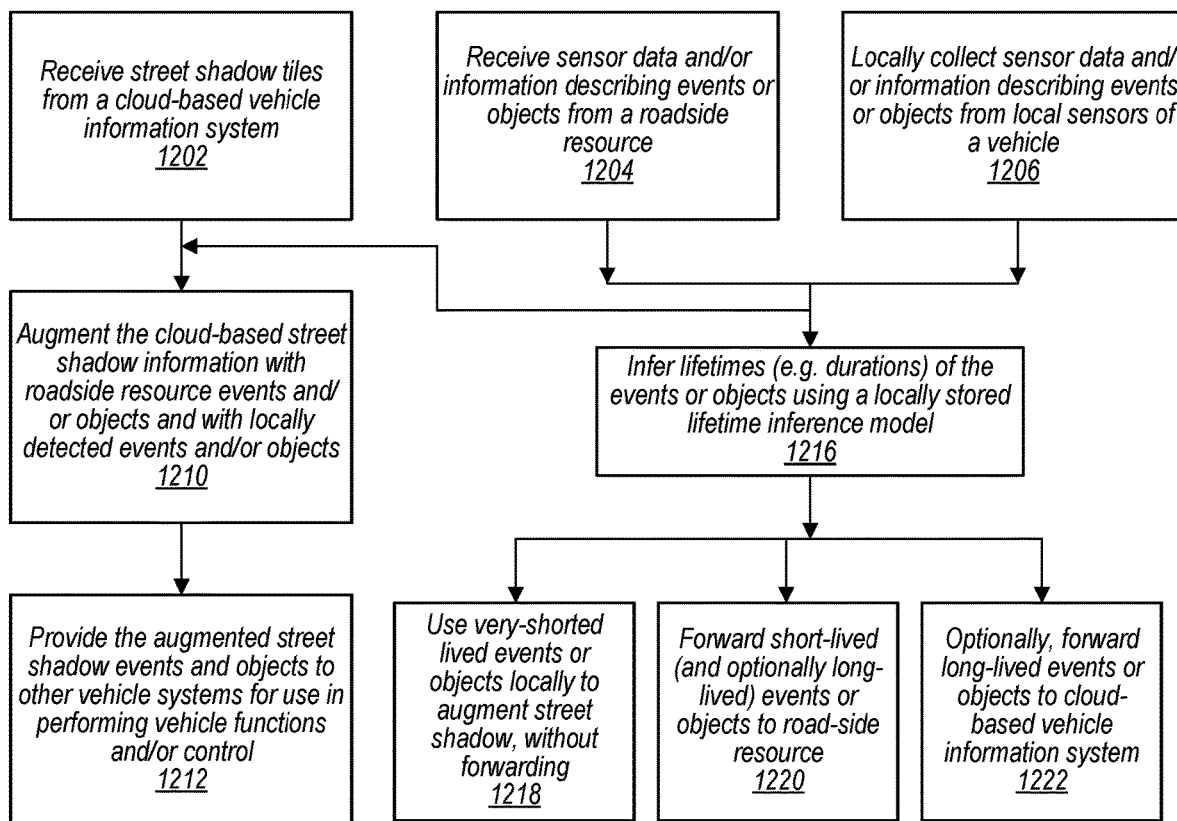
FIG. 12 is a process flow diagram illustrating steps performed at a vehicle, for example by an in-vehicle agent, to generate a composite street shadow using events and objects provided to the vehicle from a cloud-based vehicle information system, events and objects provided to the vehicle from a roadside resource, and/or events and objects detected locally at the vehicle, according to some embodiments.

FIG. 12 is a process flow diagram illustrating steps performed at a vehicle, for example by an in-vehicle agent, to generate a composite street shadow using events and objects provided to the vehicle from a cloud-based vehicle information system, events and objects provided to the vehicle from a roadside resource, and/or events and objects detected locally at the vehicle, according to some embodiments.

At block 1202, a connected vehicle receives street shadow tiles from a cloud-based vehicle information system. For example, vehicle 438 as illustrated in FIG. 4 may receive street shadow tiles from cloud-based vehicle information system 402. At block 1204, the connected vehicle receives sensor data and/or information describing events or objects from a roadside resource, such as roadside resource 428. Additionally, at block 1206, the connected vehicle locally collects sensor data and/or information describing events or objects from local sensors of a vehicle, such as sensors 442 shown in FIG. 4 for vehicle 438.

At block 1210, the connected vehicle augments the cloud-based street shadow information with roadside resource events and/or objects and with locally detected events and/or objects. And, at block 1212, provides the augmented street shadow events and objects to other vehicle systems for use in performing vehicle functions and/or control, such as to other vehicle systems 444 of vehicle 438 as shown in FIG. 4.

Additionally, at block 1216, the vehicle may optionally infer lifetimes (e.g., durations) of the events or objects using a locally stored lifetime inference model. At blocks 1218, 1220, and 1222 the connected vehicle may forward information describing the events or objects to various destinations based on the inferred lifetimes. For example, at block 1218, very-short lived objects or events are used locally to augment a street shadow without being forwarded on to a roadside resource or cloud-based vehicle information system. At block 1220, short-lived events or objects (with an expected lifetime longer than the very short-lived events or objects of block 1218) are forwarded to a roadside resource. Also, long-lived events may optionally be forwarded as well. In some embodiments, a vehicle may not distinguish between short-lived and long-lived events or objects and may forward all non-very-short lived events and objects on to the roadside resource. At block 1222, the vehicle optionally forwards long-lived events or objects to cloud-based vehicle information system.

Example Detection and Distribution of Detected Discrepancies

Figure 13:
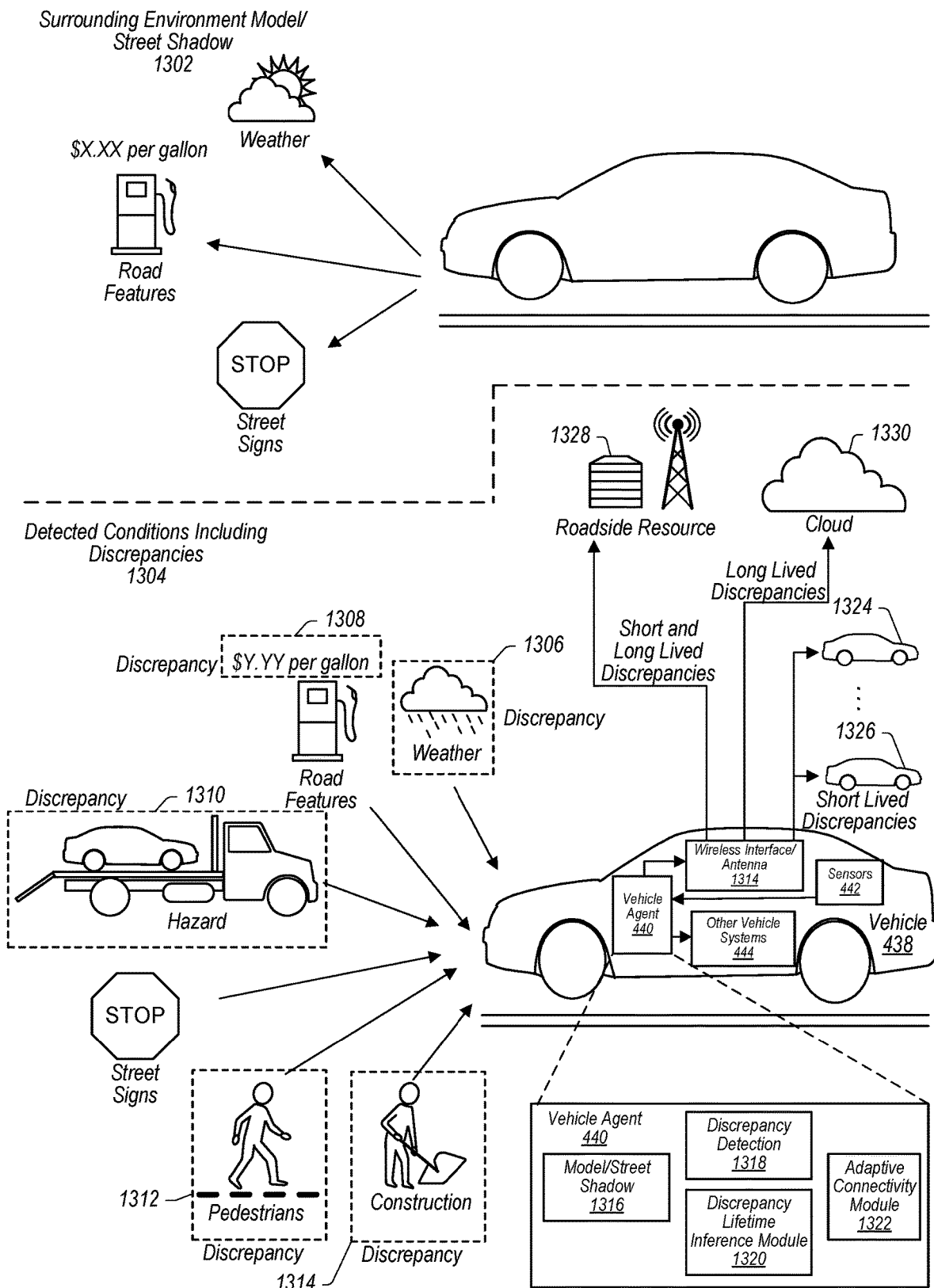
FIG. 13 illustrates an example model, such as a composite street shadow, and detected conditions in an environment surrounding a vehicle, wherein an in-vehicle agent of the vehicle identifies discrepancies between the model and the detected conditions and updates the model locally and/or distributes discrepancies to other systems (e.g., a roadside resource, a cloud-based vehicle information system, other vehicles, etc.) in order to alert the other systems about the discrepancies, according to some embodiments.

FIG. 13 illustrates an example model, such as a composite street shadow, and detected conditions in an environment surrounding a vehicle, wherein an in-vehicle agent of the vehicle identifies discrepancies between the model and the detected conditions and updates the model locally and/or distributes discrepancies to other systems (e.g., a roadside resource, a cloud-based vehicle information system, other vehicles, etc.) in order to alert the other systems about the discrepancies, according to some embodiments.

For example, a model representation or street shadow of a surrounding environment of a vehicle, such as model representation 1302 shown in FIG. 13, may differ from actual conditions, such as conditions 1304, that include discrepancies as compared to the model representation 1302. For example, a weather discrepancy 1306 and a hazard discrepancy 1310 may be present. Also, other discrepancies such as the presence (or lack thereof) of a pedestrian (1312) or construction (1314) may exist. In some embodiments, discrepancies may include differences between modeled objects and/or events and actually detected objects and/or events. Also, in some embodiments, actual conditions may drift from model predictions. For example, a new building may be built (or torn down), a store may change names, etc. As another example of drift, an advertised price for a product or service may change, such a discrepancy 1308, wherein an actual gas price has drifted from the gas price included in the model representation 1302.

In some embodiments, sensors 442 of vehicle 438 may detect the objects and events in the surrounding environment and compare the actually detected events and objects to events and objects included in a street shadow or model. For example, discrepancy detection module 1318 may compare events or objects detected via sensors 442 to model/street shadow 1316 (which may have been augmented with objects or events received from a roadside resource). The discrepancy detection module 1318 may identify discrepancies between the actual conditions and the model conditions. The discrepancies may extend beyond just the mere presence or absence of an event or object. For example, detected discrepancies may detect drift or differences in attributes between actual and detected objects. For example, the gas station may exist in both the street shadow and in the actual environment, but the price of gas may have drifted over time. In some embodiments, a vehicle agent 440 further includes a discrepancy lifetime inference module 1320 which may be used to determine an expected lifetime of the discrepancy, for example is the discrepancy predicted to be short-lived or long-lived.

In some embodiments, short-lived discrepancies may be broadcast to other vehicles in a same geofence as the vehicle detecting the discrepancy. For example, vehicle 438 may communicate short-lived discrepancies to vehicles 1324 through 1326 via direct vehicle-to-vehicle communications. Also, short-lived and long-lived discrepancies may be provided to roadside resource 1328. The roadside resource 1328 may broadcast the short-lived discrepancies to other vehicles entering a location adjacent to, or at, the location where the discrepancy was detected. In some embodiments, the long-lived discrepancies may be forwarded from the roadside resource to a cloud-based computing device 1330, such as that may implement a vehicle information system 402. In some embodiments, the vehicle 438 may communicate long-lived discrepancies directly to the cloud-based computing devices 1330, without necessarily routing the discrepancies through a roadside resource 1328.

In some embodiments, a vehicle agent 440 may additionally use an adaptive connectivity module 1322 to select a connectivity option to be used to communicate the discrepancies. For example, safety-related discrepancies may be sent using a fastest connectivity option regardless of cost, whereas non-safety related discrepancies may be communicated taking into account the need to quickly distribute the discrepancies and the cost of the network usage to communicate the discrepancies. Additional details about example adaptive connectivity implementations are described in FIG. 17.

In some embodiments, the lifetimes of the discrepancies, for example as determined by discrepancy lifetime inference module 1320, may be attached to the discrepancies as metadata. In some embodiments, expired discrepancies may be removed from a set of discrepancies broadcast via roadside resource 1328 (or cloud-computing devices 1330).

Figure 14:
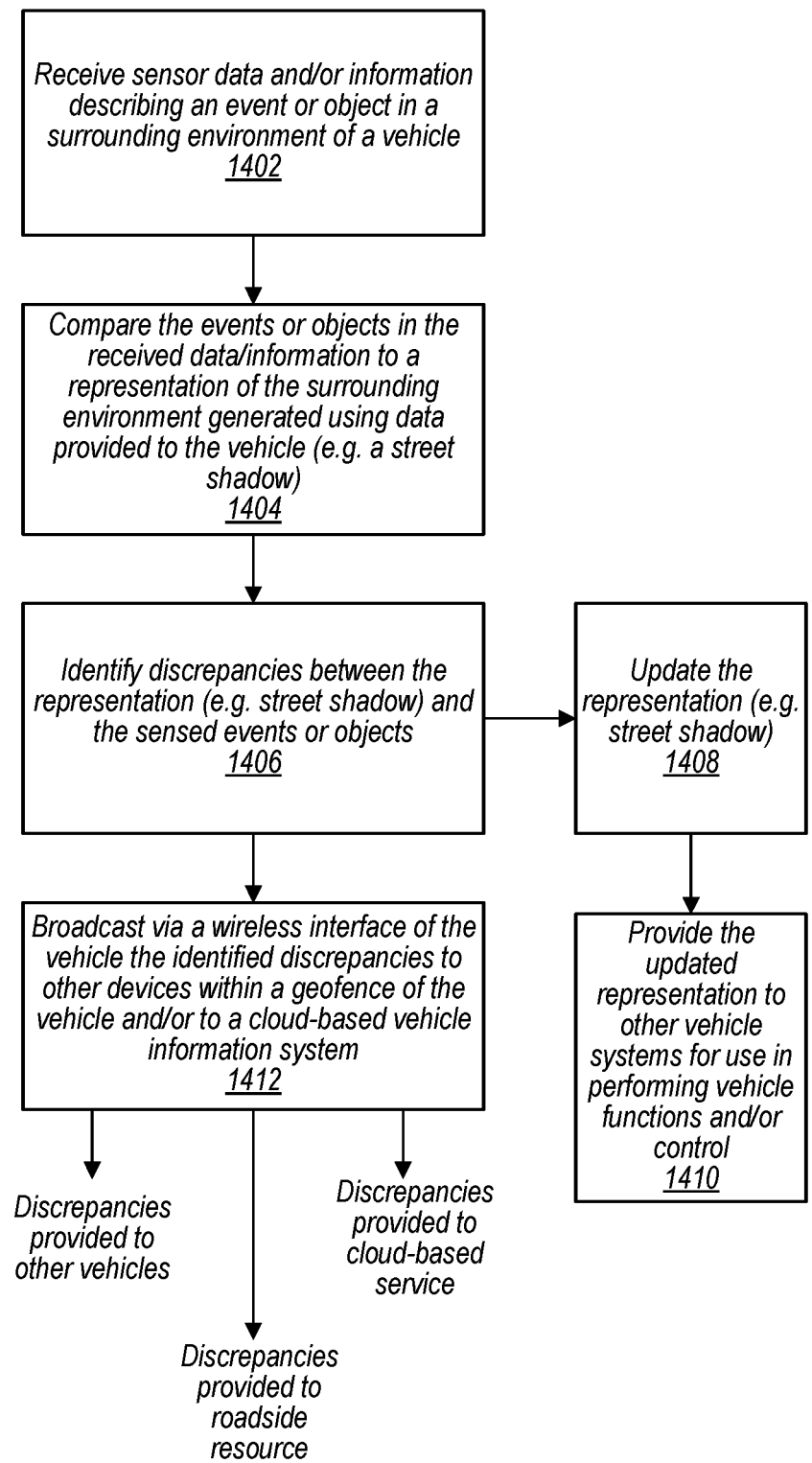
FIG. 14 is a process flow diagram illustrating steps an in-vehicle agent of a vehicle performs to identify discrepancies between a model used by the vehicle and detected events and objects in an environment surrounding the vehicle, wherein the in-vehicle agent further propagates the discrepancies to other vehicles, a roadside resource and/or a cloud-based vehicle information system, according to some embodiments.

FIG. 14 is a process flow diagram illustrating steps an in-vehicle agent of a vehicle performs to identify discrepancies between a model used by the vehicle and detected events and objects in an environment surrounding the vehicle, wherein the in-vehicle agent further propagates the discrepancies to other vehicles, a roadside resource and/or a cloud-based vehicle information system, according to some embodiments.

At block 1402, a vehicle agent, such as vehicle agent 440, receives sensor data and/or information describing an event or object in a surrounding environment of a vehicle. At block 1404, the vehicle agent compares the events or objects in the received data/information to a representation of the surrounding environment generated using data provided to the vehicle (e.g., a street shadow). Then, at block 1406, the vehicle agent identifies discrepancies between the representation (e.g., street shadow) and the sensed events or objects. The vehicle agent may, at block 1408, update the representation (e.g., street shadow) and, at block 1410, provide the updated representation to other vehicle systems for use in performing vehicle functions and/or control. For example, the discrepancy detection module 1318 of vehicle agent 440 may provide a model representation with the updated discrepancies (or the discrepancies themselves) to other vehicle systems 444.

Additionally, at block 1412, the vehicle agent may cause the discrepancies to be broadcast via a wireless interface of the vehicle to other devices, such as via wireless interface/antenna 1314 of vehicle 438. In some embodiments, the broadcast may be limited to other devices within a certain range of the vehicle detecting the discrepancies, such as other devices in a same geofence as the vehicle. Additionally, the discrepancies may be sent to a roadside resource and/or cloud-based system, such as vehicle information system 402.

Figure 15:
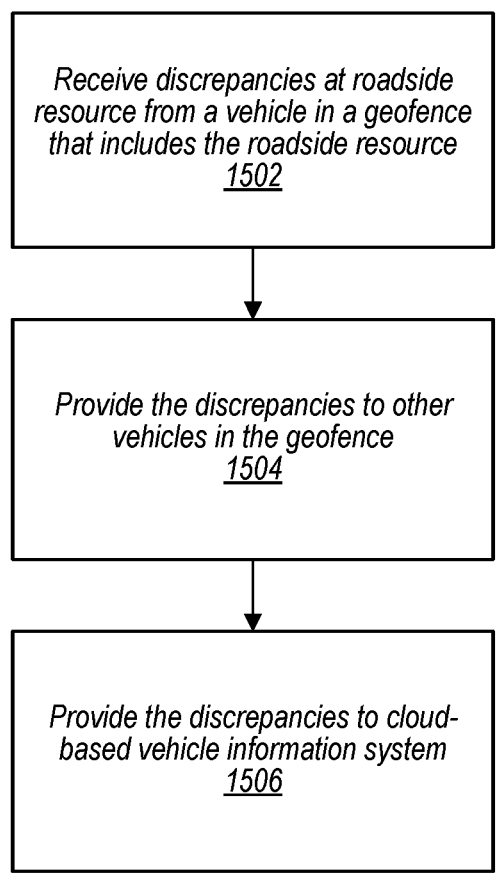
FIG. 15 is a process flow diagram illustrating steps a roadside resource performs to distribute discrepancies received from a vehicle to other vehicles and/or to a cloud-based vehicle information system, according to some embodiments.

FIG. 15 is a process flow diagram illustrating steps a roadside resource performs to distribute discrepancies received from a vehicle to other vehicles and/or to a cloud-based vehicle information system, according to some embodiments.

At block 1502, a roadside resource receives discrepancies from a vehicle. The vehicle may be located in a same geofence as the roadside resource. At block 1504, the roadside resource provides the discrepancies to other vehicles in the geofence, and at block 1506, provides the discrepancies to a cloud-based vehicle information system, such as vehicle information system 402.

Figure 16:
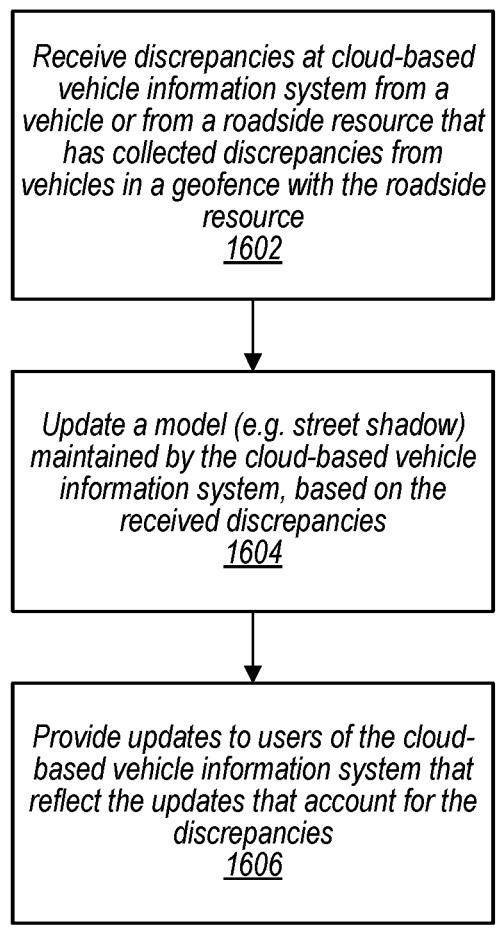
FIG. 16 is a process flow diagram illustrating steps a cloud-based vehicle information system takes in order to update a model (e.g., street shadow) provided by the cloud-based vehicle information system to incorporate discrepancies detected by vehicles, according to some embodiments.

FIG. 16 is a process flow diagram illustrating steps a cloud-based vehicle information system takes in order to update a model (e.g., street shadow) provided by the cloud-based vehicle information system to incorporate discrepancies detected by vehicles, according to some embodiments.

At block 1602, the cloud-based vehicle information system receives discrepancies from a vehicle, or from a roadside resource, that has collected discrepancies from vehicles in a geofence with the roadside resource. At block, 1604, the cloud-based vehicle information system updates a model (e.g., street shadow) maintained by the cloud-based vehicle information system, based on the received discrepancies. Also, at block 1606, the cloud-based vehicle information system provides updates to users of the cloud-based vehicle information system that reflect the updates that account for the discrepancies.

Figure 17:
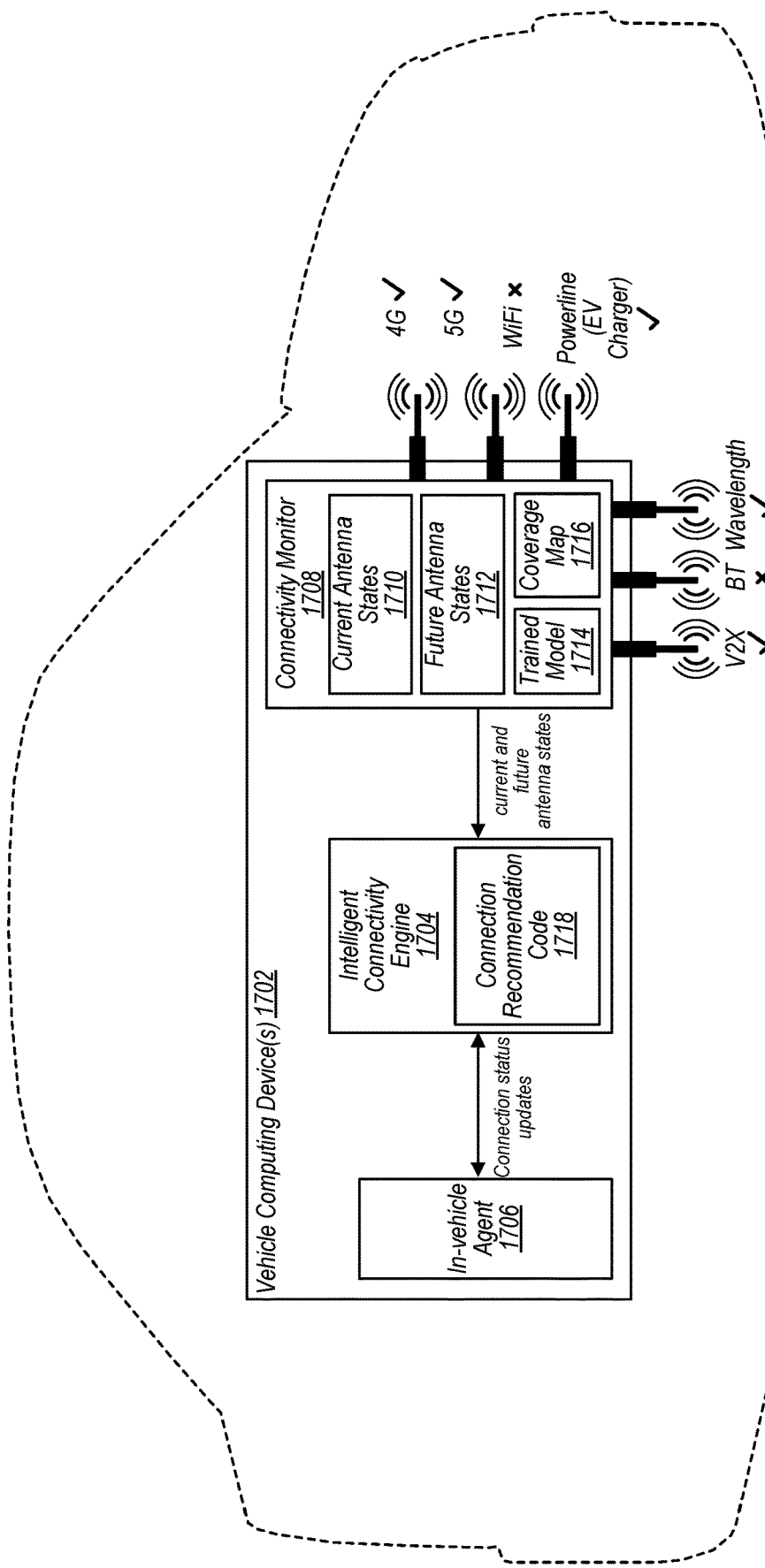
FIG. 17 is a logical diagram of a vehicle illustrating various types of antennas that may be included in the vehicle and also illustrating an intelligent connectivity engine that may determine which antenna to use for a given communication, according to some embodiments.

FIG. 17 is a logical diagram of a vehicle illustrating various types of antennas that may be included in the vehicle and also illustrating an intelligent connectivity engine that may determine which antenna to use for a given communication, according to some embodiments.

In the depicted example, one or more computing devices 1702 implement an intelligent connectivity engine 1704, an in-vehicle agent 1706, and a connectivity monitor 1708. In various embodiments, the intelligent connectivity engine, in-vehicle agent, and connectivity monitor may be implemented/distributed across any number of computing devices of the vehicle.

In some embodiments, the intelligent connectivity engine, in-vehicle agent, and connectivity monitor may be implemented within a particular computing device (e.g., within a hardware module). In an embodiment, the hardware module may be initially configured at a manufacturer site or service provider site and shipped to a client for installation at the client's site (e.g., at a vehicle assembly line). In some embodiments, some or all of the intelligent connectivity engine, in-vehicle agent, and/or connectivity monitor may be downloaded from a service provider's remote provider network (e.g., at the client's site or after the vehicle is purchased/used by a customer).

The connectivity monitor 1708 may monitor/store the current antenna states 1710 and/or the future antenna states 1712 for any number of different antennas (or wired interfaces) of the vehicle that may each transmit/receive radio signals according to a different radio protocol (or according to different wired protocols in the case of wired interfaces). In the depicted example, the antennas include a vehicle-to-vehicle antenna (V2X), a Bluetooth antenna (BT), a wavelength antenna, a 4G antenna, a 5G antenna, a Wi-Fi antenna, and a powerline wired interface (e.g., for use with an electric vehicle charger).

The connectivity monitor 1708 may also include one or more trained models 1714. A trained model may be trained to use inputs based on a current state of connectivity options, a current location of the vehicle, a local coverage map, an expected future location of the vehicle (which may itself be determined from a trained model), and/or any other number of inputs and output a predicted future state of the connectivity option (e.g., at one or more points in time in the future and/or during one or more future time windows) based on the current state and/or other inputs. For example, the model may output a prediction that the 5G antenna will be available with maximum bandwidth capability (or available with at least a certain level of bandwidth capability) starting in 10 minutes because the predicted location of the car in 10 minutes will be at the beginning of a 5G coverage area with a strong 5G signal. In embodiments, one or more trained models may predict where a vehicle will be at any point(s) in time in the future based on any number of inputs.

In some embodiments, a future location may be predicted by a model based on any number of inputs such as a current GPS (global positioning system) location, a current/planned route that the vehicle is following, and or any other inputs, such as a predicted travel speed along one or more locations or portions of the route based on current traffic congestion/conditions and/or predicted traffic congestion/conditions along the one or more locations or portions of the route. Another example of an input that may be used to predict a future location of the vehicle is location history. For example, the vehicle may have been driven to work along a specific route on a particular day of the week (e.g., Friday) or the vehicle may have been driven along a longer and/or different route when traffic was heavy along a more frequently used route. If it is Friday, then the model may use the specific route when predicting the future vehicle location. If there is traffic along the more frequently used route, then the model may use the longer and/or different route when predicting the future vehicle location. The connectivity monitor 1708 may also include a coverage map 1716, which may indicate a coverage area for one or more radio protocols used by the vehicle (e.g., for some or all of the antennas).

In some embodiments, the connectivity monitor 1708 may determine a current state and/or predicted future state of respective connectivity options of a plurality of connectivity options of the vehicle (e.g., multiple different antennas). As depicted, different connectivity options may be configured to communicate according to different radio protocols. The connectivity monitor 1708 may then send to the intelligent connectivity engine 1704 the current state and/or future state of the respective connectivity options.

Note that in some embodiments, any of the techniques discussed herein for antennas (e.g., wireless communication interfaces) may also apply to any number of wired communications interfaces, such as the powerline interface of the depicted example. For example, some workloads may have criteria that specify the workload is required to use the powerline (or other type of wired communications interface) in order to transmit and/or receive data and those workloads may be assigned for current or future execution, based at least on the current and/or predicted state of the powerline.

The intelligent connectivity engine 1704 may receive the current state and/or future state of the respective connectivity options as well as prioritization information for a communication to be performed. Based at least on the current state and/or future state of the respective connectivity options and based on the prioritization for the communication, the intelligent connectivity engine may assign at least one object to be communicated for current retrieval and at least another to be communicated for future retrieval.

In an embodiment, to determine the future state of a particular antenna, the connectivity monitor (or intelligent connectivity engine) may determine the future state for the particular antenna based at least on one or more of: a planned route for the vehicle, a coverage map 1716 for a radio protocol used by the antenna, and/or one or more environmental conditions for at least a portion of the planned route. For example, the intelligent connectivity engine may determine that, at the current vehicle speed and based on the planned route and coverage map, the future state of the particular antenna will be much higher bandwidth capability starting in 10 minutes (e.g., an upcoming strong signal area on the coverage map).

As another example, the intelligent connectivity engine may determine that, at the current vehicle speed and based on the planned route and environmental conditions at an upcoming portion of the route, the future state will be much lower bandwidth capability for the particular antenna starting in 10 minutes (e.g., storm clouds that reduce bandwidth of a satellite antenna). In various embodiments, an intelligent connectivity engine and/or connectivity monitor may predict a future state of a connectivity option at any particular time in the future with or without the use of a trained model.

The methods described herein may in various embodiments be implemented by any combination of hardware and software. For example, in one embodiment, the methods may be implemented by a computer system (e.g., a computer system as in FIG. 18) that includes one or more processors executing program instructions stored on a computer-readable storage medium coupled to the processors.

The program instructions may implement the functionality described herein (e.g., the functionality of the vehicle software and/or vehicle information system, the in-vehicle agent, the intelligent connectivity engine, the connectivity monitor, the roadside resource and any other components described herein). The various methods as illustrated in the figures and described herein represent example embodiments of methods. The order of any method may be changed, and various elements may be added, reordered, combined, omitted, modified, etc.

Figure 18:
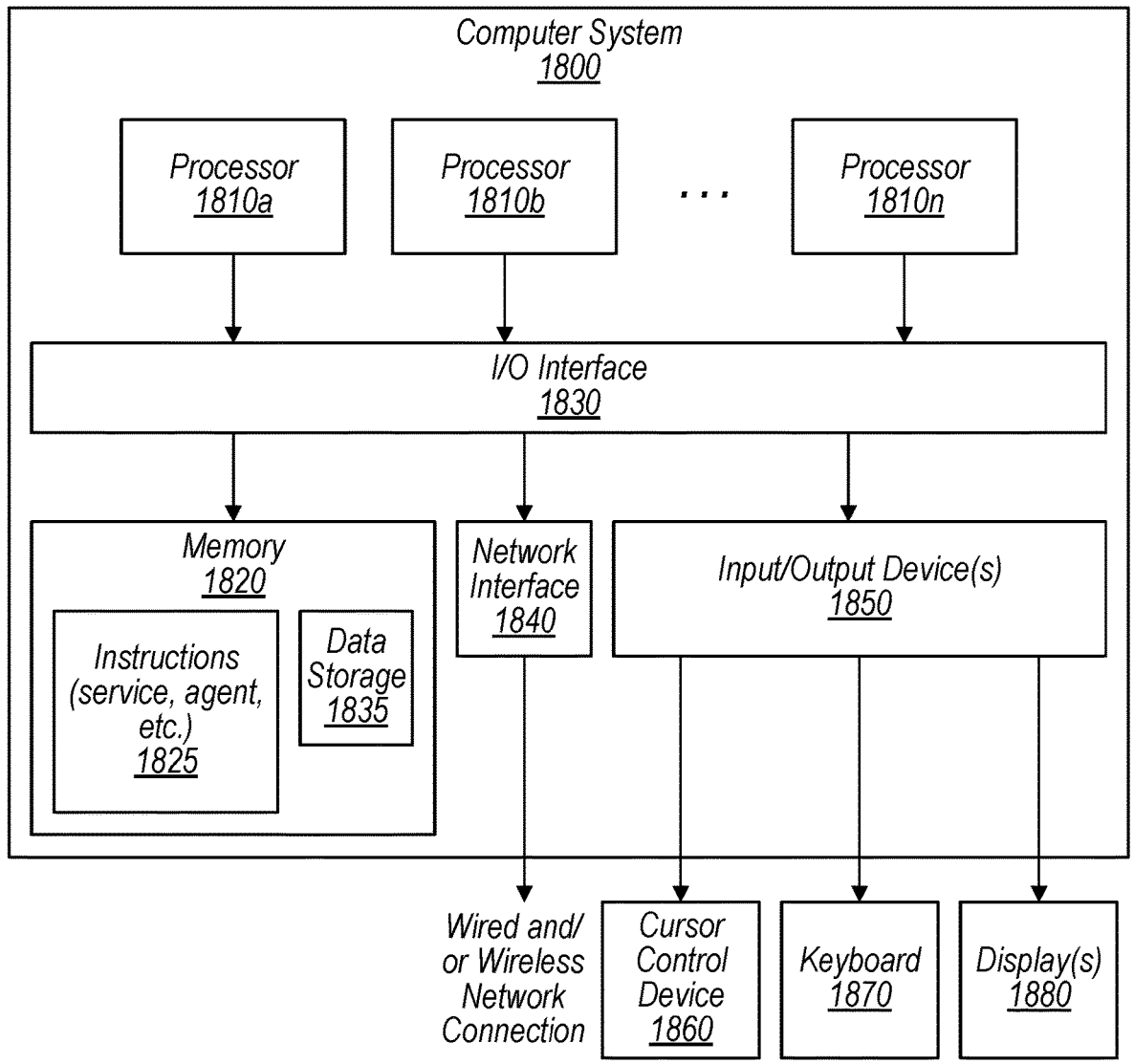
FIG. 18 is a block diagram illustrating an example computing system, according to some embodiments.

Embodiments implement vehicle software and/or content distribution using direct vehicle-to-vehicle communications, which may be implemented using one or more of various systems or devices. One such computer system is illustrated by FIG. 18. For example, cloud computing system 104 may include components as shown for computer system 1800. In different embodiments, computer system 1800 may be any of various types of devices, including, but not limited to an application server, storage device, a peripheral device such as a switch, modem, router, or in general any type of computing node or compute node, computing device (e.g., cloud computing device, edge computing device, computing device of a vehicle, etc.), compute device, or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. Display(s) may include standard computer monitor(s) and/or other display systems, technologies or devices, in one embodiment. In some embodiments, it is contemplated that embodiments may be implemented using a single instance of computer system 1800, while in other embodiments multiple such systems, or multiple nodes making up computer system 1800, may host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions, in one embodiment. For example, in various embodiments, processors 1810 may be general-purpose or embedded processors implementing any of a variety of instruction set architectures (ISAs), such as the x86, PowerPC. SPARC, or MIPS ISAs, ARM, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1820 may store program instructions 1825 and/or data accessible by processor 1810, in one embodiment. In various embodiments, system memory 1820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above (e.g., the vehicle software and/or vehicle information system, the in-vehicle agent, and any other components, etc.) are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800. A computer-accessible medium may include non-transitory storage media or memory media such as magnetic or optical media, e.g., disk or CD/DVD-ROM coupled to computer system 1800 via I/O interface 1830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840, in one embodiment.

In one embodiment, I/O interface 1830 may be coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may allow data to be exchanged between computer system 1800 and other devices attached to a network, such as other computer systems, or between nodes of computer system 1800, in one embodiment. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or retrieving data by one or more computer system 1800, in one embodiment. Multiple input/output devices 1850 may be present in computer system 1800 or may be distributed on various nodes of computer system 1800, in one embodiment. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1825 that implement the various embodiments of the systems as described herein, and data store 1835, comprising various data accessible by program instructions 1825, in one embodiment. In one embodiment, program instructions 1825 may include software elements of embodiments as described herein and as illustrated in the figures. Data storage 1835 may include data that may be used in embodiments (e.g., various policies, state of antenna or other connectivity option, coverage map, model, configuration data, data, metadata, etc.). In other embodiments, other or different software elements and data may be included.

Those skilled in the art will appreciate that computer system 1800 is merely illustrative and is not intended to limit the scope of the embodiments as described herein. In particular, the computer system and devices may include any combination of hardware or software that can perform the indicated functions, including a computer, application server, storage device, a peripheral device such as a switch, modem, router, or in general any type of computing or electronic device. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1800 may be transmitted to computer system 1800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more roadside resources; and
   one or more cloud computing devices, configured to:
      communicate with a vehicle agent configured to be executed in a vehicle runtime environment, wherein the vehicle agent, when executed in the vehicle runtime environment, is further configured to:
         receive sensor data and/or information describing an event or object, from one or more systems of a vehicle; and
         cause the sensor data and/or the information describing the event or the object to be provided to a given one of the one or more roadside resources along with location data indicating a location at which the sensor data and/or the information describing the event or the object was detected;
   wherein the given one of the one or more roadside resources is configured to:
      determine an event type for the event or an object type for the object;
      store, based on a determination that the event type or the object type is short-lived, the sensor data and/or the information describing the object locally at the roadside resource, wherein the determination that the event type or the object type is short-lived is based on an estimated duration of the event or an estimated amount of time the object will be present at the location being below or equal to a threshold duration;
      provide the sensor data and/or the information to other vehicles in communication with the roadside resource during an expected lifetime of the short-lived event or object; and
      forward, based on a determination that the event type or the object type has an estimated duration that exceeds the threshold duration, the sensor data and/or the information to the one or more cloud computing devices.

2. The system of claim 1, wherein the vehicle agent, when executed in the vehicle runtime environment, is further configured to:
   receive from the one or more cloud computing devices a street shadow representing events and objects in a surrounding environment of the vehicle;
   receive, from the one or more roadside resources, information about additional events or objects in the surrounding environment of the vehicle; and
   augment the street shadow received from the one or more cloud computing devices with the additional events or objects in the surrounding environment of the vehicle as indicated in the information received from the one or more roadside resources.

3. The system of claim 2, wherein the vehicle agent, when executed in the vehicle runtime environment, is further configured to:
   additionally augment the street shadow with locally detected events or objects included in the received sensor data and/or the information received from the one or more systems of the vehicle.

4. The system of claim 1, wherein the vehicle agent, when executed in the vehicle runtime environment, is further configured to:
   determine an estimated lifetime for the detected event or object;
   cause information describing an event or an object with an expected lifetime less than a first threshold to be made available for local use at the vehicle to augment a street shadow used by the vehicle;
   cause information describing an event or an object with an expected lifetime greater than the first threshold to be provided to the given one of the roadside resources for use by other vehicles in a geofence comprising the given roadside resource; and
   cause information describing an event or an object with an expected lifetime greater than the first threshold and greater than a second threshold to be provided to the one or more cloud-based computing devices for use by other vehicles in a plurality of geofences.

5. The system of claim 1, wherein the one or more cloud computing devices are further configured to:
   provide the vehicle with street shadow tiles for the location where the vehicle is located, wherein the street shadow tiles have been updated based on objects or events detected by other vehicles.

6. The system of claim 5, wherein the one or more cloud computing devices are further configured to:
receive from the vehicle agent, or from the vehicle agent via the given roadside resource, an indication of the event or the object described in the sensor data; and
determine a quantity of street shadow tiles to be provided to the vehicle based on an event type of the event or an object type of the object.

7. The system of claim 1, wherein the one or more cloud computing devices are further configured to:
maintain a first street shadow for a first customer, wherein the first street shadow is updated using the sensor data or the information forwarded to the one or more cloud computing devices, from the vehicle, for an event type or an object type that is long-lived, wherein a determination that the event type or the object type is long-lived is based on an estimated duration of the event or an estimated amount of time the object will be present at the location being beyond the threshold duration; and
maintain a second street shadow for a second customer, wherein the second street shadow is updated using sensor data or information forwarded to the one or more cloud computing devices, from one or more other vehicles, for the event type or the object type that is long-lived.

8. The system of claim 7, wherein the one or more cloud-computing devices are further configured to:
receive a federated query targeting events or objects included in the first street shadow and the second street shadow; and
augment a portion of the first street shadow to be provided to the vehicle with events or objects included in the second street shadow.

9. The system of claim 1, wherein the one or more roadside resources are further configured to:
dynamically adjust a threshold expected lifetime used to determine events or objects having event types or object types that are short-lived that are to be locally stored at a given roadside resource, based on an availability of resources at the given roadside resource.

10. The system of claim 1, wherein the one or more cloud computing devices are further configured to:
at one or more later moments in time, receive sensor data and/or information for the location;
determine based on the received sensor data and/or the information received at the one or more later moments in time whether long-lived events or objects included in the previously received sensor data and/or the information are still present at the location; and
update a model used to determine the estimated duration of the event or the estimated amount of time the object will be present at the location.

11. A method, comprising:
receiving, at a roadside resource, sensor data and/or information describing an event or an object detected by a vehicle and location data indicating a location at which the sensor data and/or the information describing the event or the object was detected by the vehicle;
determining an event type for the event or an object type for the object;
determining, by the roadside resource, that the event type or the object type is short-lived based on an estimated duration of the event or an estimated amount of time the object will be present at the location being below or equal to a threshold duration;
providing the sensor data and/or the information to other vehicles in communication with the roadside resource during an expected lifetime of the event or object; and
forwarding the sensor data and/or the information to one or more cloud computing devices, based on a determination that the event type or the object type have an estimated duration that exceeds the threshold duration.

12. The method of claim 11, further comprising:
receiving, at the roadside resource, sensor data and/or information describing another event or another object detected by the vehicle and location data indicating a location at which the sensor data and/or the information describing the other event or the other object was detected by the vehicle; and
determining, by the roadside resource, that an event type for the other event or an object type for the other object is short-lived or long-lived; and
forwarding, based on a determination that the event type for the other event or the object type for the other object is long-lived, the sensor data and/or the information describing the other event or the other object to the one or more cloud computing devices.

13. The method of claim 12, further comprising:
dynamically adjusting the threshold duration used to determine whether events or objects are long-lived and to be forwarded to the one or more cloud-based computing devices based, at least in part, on an availability of resources at the roadside resource to store and/or distribute the sensor data and/or the information to other vehicles in communication with the roadside resource.

14. The method of claim 11, further comprising:
performing, by the roadside resource, anomaly detection to detect anomalies in the sensor data and/or the information describing the event or the object detected by the vehicle; and
excluding anomalous sensor data and/or information from the sensor data and/or the information provided to the other vehicles in communication with the roadside resource.

15. The method of claim 11, wherein the sensor data and/or the information are included in a street shadow, and wherein said providing the sensor data and/or the information to the other vehicles comprises providing one or more tiles of the street shadow to the other vehicles.

16. The method of claim 15, further comprising:
maintaining a first street shadow for a first group of vehicles associated with a first entity;
maintaining a second street shadow for a second group of vehicles associated with a second entity;
receiving a request for one or more street shadow tiles for a location at which a vehicle is located;
performing a federated query of the first street shadow and the second street shadow to identify objects or events at the location at which the vehicle is located; and
providing one or more composite street shadow tiles comprising one or more events or one or more objects returned from the first and second street shadows via the federated query.

17. The method of claim 11, further comprising:
receiving, at the roadside resource, sensor data and/or information describing an event or an object detected by a connected piece of roadside infrastructure and location data indicating a location of the connected piece of roadside infrastructure;

determining, by the roadside resource, based on an event type of the event or an object type of the object detected by the connected piece of roadside infrastructure, an estimated duration of the event or an estimated amount of time the object will be present at the location of the connected piece of roadside infrastructure; and providing the sensor data and/or the information received from the connected piece of roadside infrastructure to the vehicle or the other vehicles in communication with the roadside resource during a lifetime of the event or the object present at the location of the connected piece of roadside infrastructure.

18. One or more non-transitory, computer-readable, storage media, storing program instructions that, when executed on or across one or more processors, cause the one or more processors to:

receive sensor data and/or information describing an event or object in a surrounding environment of a vehicle;

augment a street shadow received by the vehicle from one or more cloud computing devices with the event or the object in the surrounding environment of the vehicle;

determine an event type for the event or an object type for the object;

determine an estimated duration of the event or an estimated amount of time the object will be present at a given location in the surrounding environment of the vehicle; and provide, based on a determination that the event type or the object type is long-lived based on an estimated duration exceeding a threshold duration, the sensor data and/or the information describing the event or the object to a roadside resource along with location data indicating a location at which the sensor data and/or the information describing the event or the object was detected.

19. The one or more non-transitory, computer-readable, storage media of claim 18, wherein the program instructions, when executed on or across the one or more processors, cause the one or more processors to:

receive, from one or more roadside resources, information about additional events or objects in the surrounding environment of the vehicle; and further augment the street shadow received from the one or more cloud computing devices with the additional events or objects in the surrounding environment of the vehicle as indicated in the information received from the one or more roadside resources.

20. The one or more non-transitory, computer-readable, storage media of claim 18, wherein the program instructions, when executed on or across the one or more processors, cause the one or more processors to:

receive street shadow tiles from the one or more cloud computing devices for the location where the vehicle is located, wherein the street shadow tiles have been updated based on objects or events detected by other vehicles.

* * * * *